(12) United States Patent
Seethalakshmi et al.

(10) Patent No.: US 12,401,643 B2
(45) Date of Patent: Aug. 26, 2025

(54) SECURE ONBOARDING OF USERS AND ORGANIZATIONS ON MOBILITY-AS-A-SERVICE (MaaS) PLATFORM

(71) Applicant: SONY GROUP CORPORATION, Tokyo (JP)

(72) Inventors: Prashant Seethalakshmi, Bengaluru (IN); Sadayoshi Murao, Bengaluru (IN); Takashi Togame, Bengaluru (IN); Srinivasa Pingili, Bengaluru (IN)

(73) Assignee: SONY GROUP CORPORATION, Tokyo (JP)

( * ) Notice: Subject to any disclaimer, the term of this patent is extended or adjusted under 35 U.S.C. 154(b) by 225 days.

(21) Appl. No.: 18/188,822

(22) Filed: Mar. 23, 2023

(65) Prior Publication Data
US 2024/0323185 A1    Sep. 26, 2024

(51) Int. Cl.
    *H04L 9/40*    (2022.01)
(52) U.S. Cl.
    CPC ........ *H04L 63/0876* (2013.01); *H04L 63/105* (2013.01); *H04L 63/20* (2013.01)
(58) Field of Classification Search
    CPC ... H04L 63/0876; H04L 63/105; H04L 63/20; H04L 63/104; G06Q 10/02; G06Q 30/018; G06Q 50/14; G06Q 2220/00
    See application file for complete search history.

(56) References Cited

U.S. PATENT DOCUMENTS

| | | | | |
|---|---|---|---|---|
| 5,835,436 A | * | 11/1998 | Ooishi | G11C 11/4096 365/230.03 |
| 5,890,194 A | * | 3/1999 | Kim | G11C 8/18 711/209 |
| 11,488,159 B1 | * | 11/2022 | Murao | G06Q 20/0855 |
| 2023/0036353 A1 | * | 2/2023 | Wakabayashi | H04M 15/61 |

OTHER PUBLICATIONS

Stockburger, et al., "Blockchain-enabled decentralized identity management: The case of self-sovereign identity in public transportation", Blockchain: Research and Applications, Elsevier, ScienceDirect, vol. 2, Issue 2, Jun. 2021, 18 pages.

(Continued)

*Primary Examiner* — Khoi V Le
(74) *Attorney, Agent, or Firm* — CHIP LAW GROUP

(57) ABSTRACT

An electronic device for secure onboarding of users and organizations on a mobility-as-a-service (MaaS) platform is disclosed. A set of onboarding agreements is received from nodes of a MaaS network. A set of service and agreement templates are generated to create a MaaS node group corresponding to the set of nodes. The set of onboarding agreements and the set of service and agreement templates are transmitted to the MaaS node group. An onboarding request is received from a first node of the MaaS network. A decentralized identity (DID) of the first node is verified. A set of parameters and a service agreement associated with the first node is transmitted to the first node. The service agreement is transmitted to the MaaS node group. An Application Programming Interface (API) key of a data hub is generated for the MaaS network to onboard the first node to the MaaS node group.

20 Claims, 12 Drawing Sheets

(56) References Cited

OTHER PUBLICATIONS

Bothos, et al., "Leveraging Blockchain for Open Mobility-as-a-Service Ecosystems", WI '19 Companion: IEEE/WIC/ACM International Conference on Web Intelligence—Companion vol. Oct. 14, 2019, pp. 292-296.

"Self-Sovereign Identity meets Mobility-as-a-Service", MyEGO, Wunder Mobility summit, Oct. 11, 2021, 03 pages.

* cited by examiner

SECURE ONBOARDING OF USERS AND ORGANIZATIONS ON MOBILITY-AS-A-SERVICE (MaaS) PLATFORM

CROSS-REFERENCE TO RELATED APPLICATIONS/INCORPORATION BY REFERENCE

None

FIELD

Various embodiments of the disclosure relate to mobility-as-a-service (MaaS) platform. More specifically, various embodiments of the disclosure relate to an electronic device and method for secure onboarding of users and organizations on mobility-as-a-service (MaaS) platform.

BACKGROUND

Onboarding refers to a process in which a new user or a new organization is registered with an online portal (e.g., mobility-as-a-service (MaaS) platform) to offer a service or consume a service, through the online portal. The process of onboarding may include activities, such as, a setup of credentials, configuration of email addresses, creation of roles, and assignment of privileges etc., for users (such as, personnel of an organization). The onboarding of a user to the online portal may enable the user to access a platform or services associated with the online portal. For example, a MaaS platform may be a digital platform that may be used manage travel-related services. The MaaS platform may provide end-to-end travel services that may include various transportation modes such as public transport modes (such as train, airplane, or bus), commercial transport services (such as bike and car sharing and taxis) through a single digital platform. The MaaS platform may also provide payment services and transaction processing services for each journey (which may include multiple legs) managed by the MaaS platform.

The MaaS platform may require a coordinated interaction between various entities (such as, multiple organizations or users) to provide the end-to-end travel services. For example, the various entities may provide transportation services, transaction processing services, payment services, and administrative (or logistic) services to enable the MaaS platform to operate and provide the end-to-end travel services to riders. Typically, for such a MaaS platform, there may be no streamlined process to onboard the various entities, such as, users, organizations, and personnel associated with organizations. The onboarding of a new user or a new organization to the MaaS platform may be a cumbersome and a time-consuming process that may require manual verification or authorization. For example, manual verification of new users through email may be required. In such case, the onboarding process may be an ad-hoc process. During the onboarding process, sensitive information (such as, name, email address, or organization name etc.) associated with the user, the organization, or the personnel associated with the organization may be available to third party administrators of the MaaS platform. The availability of such sensitive information to the third parties may give rise to confidentiality and privacy concerns.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method for secure onboarding of users and organizations on mobility-as-a-service (MaaS) platform is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
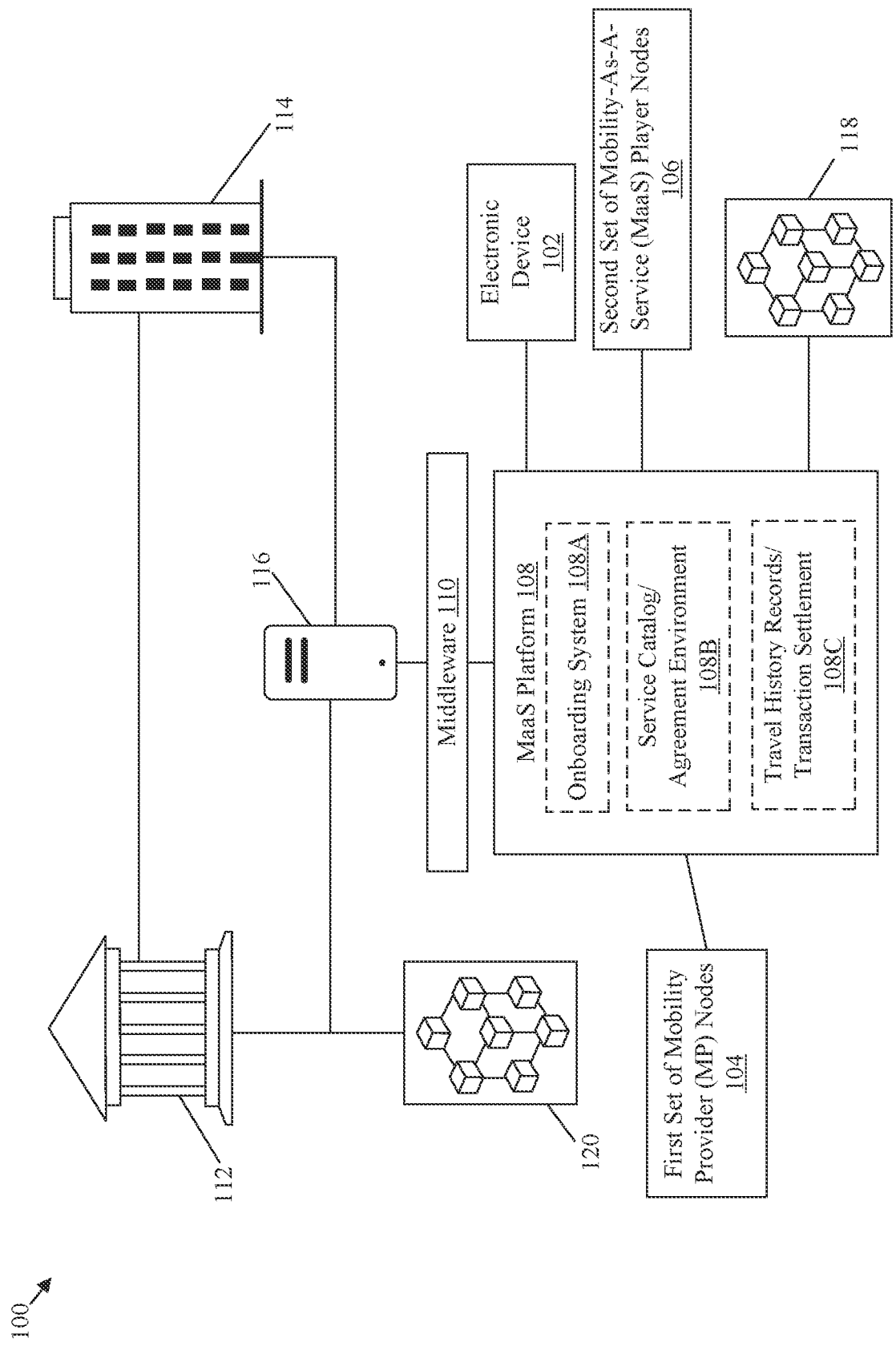
FIG. 1 is a block diagram that illustrates an exemplary network environment for secure onboarding of users and organizations on a mobility-as-a-service (MaaS) platform, in accordance with an embodiment of the disclosure.

The following described implementations may be found in the disclosed electronic device and method for secure onboarding of users and organizations on mobility-as-a-service (MaaS) platform. The disclosed electronic device may be a part of a federated transportation management system that may facilitate multiple homogeneous or heterogenous mobility providers and their infrastructure, such as ticketing gates, applications, and/or Point of Sale (POS) devices to operate on the MaaS network to provide various mobility services. Each mobility provider may have secure data ownership and may control co-use of relevant transaction records through a distributed ledger. This may enhance connectivity between the various mobility providers. The electronic device may further enhance roaming management, and contract management between the different mobility providers, based on the controlled co-use of the relevant transaction records through the distributed ledger. Each mobility provider in the MaaS network may be associated with the MaaS network through a service agreement with certain terms or service and a related privacy policy. Before a node of a mobility provider joins the MaaS network, the mobility provider node may be on-boarded to the MaaS network, based on the service agreement, terms of service, and the privacy policy. On acceptance of the service agreement and based on the terms of service and the privacy policy, the node of the mobility provider may be on-boarded and admitted to the MaaS network.

Exemplary aspects of the disclosure provide an electronic device for secure onboarding of users and organizations on mobility-as-a-service (MaaS) platform. The electronic may receive a set of onboarding agreements from a set of nodes of a mobility-as-a-service (MaaS) network. The set of nodes may include at least one of a first set of mobility provider nodes and a second set of MaaS player nodes. The electronic device may generate a set of service and agreement templates based on the received set of onboarding agreements to create a MaaS node group corresponding to the set of nodes. The electronic device may transmit the received set of onboarding agreements and the generated set of service and agreement templates to the created MaaS node group. The electronic device may receive an onboarding request from a first node of the MaaS network. Based on the received onboarding request, the electronic device may verify a decentralized identity (DID) of the first node. Based on the verified DID, transmitted set of onboarding agreements, and the set of service and agreement templates, the electronic device may transmit, to the first node, a set of parameters and a service agreement associated with the first node. Based on the received service agreement, the electronic device may generate an Application Programming Interface (API) key of a data hub for the MaaS network. The first node may be onboarded to the created MaaS node group of the MaaS network based on the generated API key and the transmitted service agreement associated with the first node.

Typically, for a MaaS platform, there may be no streamlined process to onboard the various entities, such as, users, organizations, and personnel associated with organizations. The onboarding of a new user or a new organization to the MaaS platform may be a cumbersome and a time-consuming process that may require manual verification or authorization. For example, manual verification of new users through email may be required. In such case, the onboarding process may be an ad-hoc process. During the onboarding process, sensitive information (such as, name, email address, or organization name etc.) associated with the user, the organization, or the personnel associated with the organization may be available to third party administrators of the MaaS platform. The availability of such sensitive information to the third parties may give rise to confidentiality and privacy concerns.

The disclosed electronic device may receive an onboarding request from a first node (such as the first node) of the MaaS network (such as the MaaS platform). Based on the received onboarding request, a decentralized identity (DID) (such as the DID) of the first node may be verified. Further, based on the verified DID, transmitted set of onboarding agreements, and the set of service and agreement templates, a set of parameters and a service agreement associated with the first node may be transmitted to the first node. Further, the electronic device may transmit the service agreement associated with the first node to the created MaaS node group. Thereafter, based on the received service agreement, an Application Programming Interface (API) key of a data hub for the MaaS network may be generated. Thus, the first node may be onboarded to the created MaaS node group of the MaaS network based on the generated API key and the transmitted service agreement associated with the first node. For example, the first node, that may correspond to any computing device of a user, an organization, or personnel associated with the organization, may be onboarded based on generation of the API key and transmission of the service agreements. Further, the API key may be used by the onboarded user (or the organization, or personnel associated with the organization) to share data (such as, revenue data, travel data, cyclic revenue, or travel data). Thus, a streamlined and secure on-boarding of new nodes to the MaaS platform may be achieved without concerns related to confidentiality and privacy of various entities (such as, the users/organizations/personnel) to be on-boarded. After an entity is successfully on-boarded to the MaaS platform, the entity may start to communicate with the other entities of the MaaS platform and offer service (for example, in case of MaaS player nodes or mobility provider nodes) or consume services (for example, in case of end-users or mobility provider nodes) associated with the MaaS platform.

FIG. 1 is a block diagram that illustrates an exemplary network environment for secure onboarding of users and organizations on a mobility-as-a-service (MaaS) platform, in accordance with an embodiment of the disclosure. With reference to FIG. 1, there is shown a block diagram of a network environment 100. The network environment 100 (such as mobility-as-a-service (MaaS) network 100) may include an electronic device 102, a first set of mobility provider (MP) nodes 104, a second set of MaaS player nodes 106, a mobility-as-a-service (MaaS) platform 108, a first distributed ledger database 118, and a middleware 110 (which may be layered software that interfaces the various components of the MaaS network 100). The MaaS network 100 may include a network of nodes, such as an issuer node 112, a set of holder nodes 114, a verifier node 116 and a second distributed ledger database 120. In an embodiment, the MaaS platform 108 may include an onboarding system 108A, a service catalog/agreement environment 108B, and a system for travel history records/transaction settlement 108C. The issuer node 112 may be communicatively coupled to the set of holder nodes 114, the verifier node 116 and the second distributed ledger database 120. The set of holder nodes 114 may be communicatively coupled to the verifier node 116 and the issuer node 112. The verifier node 116 may be communicatively coupled to the issuer node 112, the set of holder nodes 114, the second distributed ledger database 120, and the middleware 110. The electronic device 102, the first set of mobility provider nodes 104, the second set of MaaS player nodes 106, the first distributed ledger database 118, and the middleware 110 may be communicatively coupled to the MaaS platform 108.

The electronic device 102 may include suitable logic, circuitry, interfaces, and/or code that may be configured to receive a set of onboarding agreements (for example, a master service agreement, a terms-of-service agreement, or a privacy policy agreement) from a set of nodes of a mobility-as-a-service (MaaS) network (e.g., the MaaS network 100). The MaaS network 100 may include at least one of the issuer node 112 associated with a credential issuing authority, the set of holder nodes 114 corresponding to the set of nodes, the verifier node 116 associated with a MaaS network owner, and the second distributed ledger database 120. The set of nodes may include at least one of the first set of MP nodes 104 and the second set of MaaS player nodes 106. Based on the received set of onboarding agreements, the electronic device 102 may create a MaaS node group (for example, the first set of MP nodes 104 or the second set of MaaS player nodes 106) that may correspond to the set of nodes. Further, the electronic device 102 may generate a set of service and agreement templates. Further, the electronic device 102 may transmit the received set of onboarding agreements and the generated set of service and agreement templates to the created MaaS node group. The electronic device 102 may receive an onboarding request from a first node (for example, a user, an organization, or personnel associated the organization) of the MaaS network 100. Based on the received onboarding request, the electronic device 102 may verify a decentralized identity (DID) of the first node. Based on the verified DID, the transmitted set of onboarding agreements, and the set of service and agreement templates, the electronic device 102 may transmit a set of parameters and a service agreement associated with the first node to the first node. The DID of a node (e.g., the first node) may correspond to a unique identifier that may be used to verify a digital identity of the node using a decentralized approach. For example, the DID may include a unique machine ID of the node and a global or a local timestamp associated with the node. In an embodiment, the verification of an entity (e.g., the first node) of the MaaS network 100 through a DID of the entity may enable the entity to have a greater control over sensitive identification information of the entity. Based on the DID of the entity, the entity may be authenticated using a decentralized application of cryptographic techniques on the digital identity of the entity.

The electronic device 102 may transmit the service agreement associated with the first node to the created MaaS node group. Further, the electronic device 102 may generate an Application Programming Interface (API) key of a data hub for the MaaS network 100, based on the received service agreement. Thereafter, the first node may be onboarded to the created MaaS node group of the MaaS network 100 based on the generated API key and the transmitted service agreement associated with the first node.

The first set of MP nodes 104 may include suitable logic, circuitry, code, and/or interfaces that may be configured to store transaction records associated with a respective mobility provider. For example, the first set of MP nodes 104 may store transaction records associated with a first mobility provider. In an embodiment, each of the transaction records stored on each MP node may be associated with a two-party transaction. For example, the transaction records stored on an MP node of a certain mobility provider may be associated with transactions that may involve the mobility provider and a certain MaaS provider. The transaction records may include records of trips of users. Each trip may correspond to a mobility service that may be provided by the mobility provider in at least one leg of a journey of a rider who uses the mobility service. The first set of MP nodes 104 may be referred to as nodes of a distributed ledger (such as, the first distributed ledger database 118) that may store transaction records of the various mobility providers of the MaaS network 100. In an embodiment, each MP node may be implemented as, for example, one of an edge device, an edge node, or a distributed ledger node with a fog or cloud computing capability.

In accordance with an embodiment, each of the first set of MP nodes 104 may be associated with a separate mobility provider of the MaaS network 100. The MaaS mobility service may be provided by homogeneous mobility providers (such as multiple cab ride provider companies or multiple rail companies) or heterogenous mobility providers through a homogenous group of devices, applications, or ticketing gates, or a heterogenous group of ticketing gates, applications, and Point of Sale (PoS) devices. The MaaS mobility service may be a combination of individual service offerings of one or more homogenous or heterogeneous mobility providers. The MaaS mobility service may include, for example, a train service, a bus service, a taxi/cab service, a metro rail service, an air-plane service, a fleet service, a ride hailing service, a car sharing service, a carpool service, a car rental service, a bike sharing service, or a combination thereof.

The second set of MaaS player nodes 106 may include suitable logic, circuitry, code, and/or interfaces that may be configured to prepare a transportation route, that may include one or more mobility providers of the first set of MP nodes 104 based on a demand of a customer, such as, a rider who consumes a mobility service. The MaaS player may provide personalized services to customers on a single platform. The MaaS provider thus may have a function to aggregate transport services from many transport service operators (such as the mobility providers). The MaaS players may comprise any of commercial MaaS player, public transport provider, and a government organization. The MaaS players may further manage data associated with the users that may include storage of the data and to perform analytics on the data for optimization. The MaaS player of the second set of MaaS player nodes 106 may be categorized into two categories, based on role, that may include a MaaS integrator and a MaaS operator. The MaaS integrator may correspond to the role where the MaaS players assembles the transport services from multiple transport service providers that may include activities such as technical integration, contract management and financial clearing. The MaaS operator may correspond to the role where the MaaS player provides a MaaS service to end-users or customers through a single platform.

The MaaS platform 108 may include suitable logic, circuitry, code, and/or interfaces that may be configured to provide support for trip planning, ticketing, and payment services across multiple transportation providers (such as the mobility providers). The MaaS platform 108 may support mobile and web applications that may be accessed through user devices associated with users or customers. The MaaS platform 108 may collect, and store data associated with the users. The data associated the user may include, travel history, travel time, frequency of travel, and the like. Further, the MaaS platform 108 may analyze the data to optimize travel networks and calibrate supply and demand. The MaaS platform 108 may further include, the onboarding system 108A, the service catalog/agreement environment 108B, and a system for the travel history records/transaction settlement 108C. The onboarding system 108A may be used to integrate (such as, to onboard) or disintegrate (such as, to deboard) a node from the MaaS network 100.

The system for travel history records/transaction settlement 108C may be used to record and store data associated with user or nodes of the MaaS network 100. The data associated with user or nodes may include company information associated with the first MP, service item information associated with each of the first set of transaction records, ticket sales data associated with each of the first set of transaction records, fare price master data associated with the first MP, service price master data associated with the first MP, and/or ticket transaction data associated with each of the first set of transaction records. For example, the company information associated with the first MP may include a name, an address, a number of vehicles, and/or type of vehicles, associated with a company corresponding to the first MP. The service item information associated with each of the first set of transaction records may include a date/time of a trip leg, a duration of the trip leg (based on get-in/get-out transaction messages), a distance travelled on the trip leg, and/or a type of vehicle associated with the trip leg, associated with each of the first set of transaction records. The ticket sales data associated with each of the first set of transaction records may include a price of a ticket for the trip, and/or a price of the trip leg associated with the first MP, associated with each of the first set of transaction records. The fare price master data associated with the first MP may include a trip-leg distance-based fare table, and/or a trip-leg duration-based fare table associated with the first MP. The service price master data associated with the first MP may include a traffic surcharge, a wait-time surcharge, a trip-leg duration surcharge, a day-of-week based surcharge, a time-of-day based surcharge, a holiday surcharge, and/or a service tax, associated with the first MP. The ticket transaction data associated with each of the first set of transaction records may include, but is not limited to, transaction data corresponding to a trip-leg associated with the first MP, from ticket data in each of the first set of transaction records.

The middleware 110 may include suitable logic, circuitry, code, and/or interfaces that may be configured to enable communication and message passing between various software applications, databases, application programming interfaces, and other remote or local application components. Examples of the middleware 110 may include, but are not limited to, a database middleware, an application server middleware, message-oriented middleware, transaction-processing middleware, and web middleware.

The issuer node 112 may include suitable logic, circuitry, code, and/or interfaces that may be configured to generate credentials associated with each holder node of the set of holder nodes 114. The generated credentials may correspond to a set of attributes including at least one of an organization name, an organization ID, a name and electronic-mail ID of an administrator user, a role of a user of a node, or a user privilege level associated with a user of a node. The issuer node 112 may be associated with a government organization or a private organization. The issuer node 112 may define a credential template. The credential template may further include certain attributes, for example, ID of organization, organization name, admin username (such as the personnel associated with the organization), email address of admin, role, and responsibility of the admin. In an example, the issuer node 112 may manage a creation of digital identities of the set of holder nodes 114 and an authorization of the set of holder nodes 114 to the MaaS platform 108.

The set of holder nodes 114 may include suitable logic, circuitry, code, and/or interfaces that may be configured to participate as nodes in the MaaS network 100 and be communicatively coupled to the MaaS platform 108. Each of the set of holder nodes 114 may receive credential information associated with the corresponding holder node from the issuer node 112. The received credential information may correspond to a digital identification of the holder node. The holder node may transmit an onboarding request to the electronic device 102, to onboard the holder node to the MaaS network 100. The onboarding request of the holder node may be authenticated by the verifier node 116 based on the credential information of holder node. The onboarding of the holder node to the MaaS network 100 may enable the holder node to join the MaaS network 100 and communicate with the MaaS platform 108 and the other holder nodes of the set of holder nodes 114. In an example, the set of holder nodes 114 may correspond to a mobility provider node or a MaaS player node.

The verifier node 116 may include suitable logic, circuitry, code, and/or interfaces that may be configured to receive a credential verification request associated with a first node (of a set of nodes of the MaaS network 100), based on an onboarding request associated with the first node. Further, the verifier node 116 may query a holder node (such as, a holder node associated with the same mobility provider or MaaS player as that of the first node) of the set of holder nodes 114 for verified credentials of the first node, based on the received credential verification request. Further, the verifier node 116 may receive, from the holder node, the verified credentials of the first node, based on the query. The DID of the first node may be verified based on the received verified credentials of the first node. Once the verification is completed, the first node may be onboarded. In an example, the verifier node 116 may be associated with a governing organization or administrator of the MaaS network 100.

In an embodiment, the first distributed ledger database 118 may be configured store transaction records associated with a MaaS mobility service. The first distributed ledger database 118 may correspond to a blockchain common database associated with the MaaS mobility service. The transaction records associated with the MaaS mobility service may be included in a set of state objects, such as an initial state object and an updated version of the initial state object. In an embodiment, the second distributed ledger database 120 may be configured to store credential information associated with nodes of the MaaS network 100. The stored credential information may be used for decentralized identification (DID) based verification or authentication of the nodes. The second distributed ledger database 120 may correspond to a decentralized identification (DID) blockchain database associated with the MaaS network 100. Each state object and/or credential information may correspond to a smart contract, a contract code (or rules of a transaction upon which parties to the transaction agree), and state properties (that may be updated when the transaction records and/or credential information may be updated based on transaction messages from the publisher node and/or credential creation by an issuer node). By way of example, and not limitation, each of the first distributed ledger database 118 and the second distributed ledger database 120 may be a Corda blockchain, an Ethereum blockchain, or a Hyperledger blockchain. For example, U.S. patent application Ser. No. 17/178,185 filed on Feb. 17, 2021, discloses details related to a distributed ledger database (such as, the first distributed ledger database 118 and the second distributed ledger database 120).

In operation, the electronic device 102 may be configured to receive a set of onboarding agreements from a set of nodes of a mobility-as-a-service (MaaS) network, such as, the MaaS network 100. The set of nodes may include at least one of a first set of mobility provider nodes (e.g., the first set of MP nodes 104) and a second set of MaaS player nodes (e.g., the second set of MaaS player nodes 106). The electronic device 102 may generate a set of service and agreement templates based on the received set of onboarding agreements to create a MaaS node group corresponding to the set of nodes. The electronic device 102 may transmit the received set of onboarding agreements and the generated set of service and agreement templates to the created MaaS node group. The electronic device 102 may receive an onboarding request from a first node of the MaaS network 100. Based on the received onboarding request, the electronic device 102 may verify a decentralized identity (DID) of the first node. Based on the verified DID, the transmitted set of onboarding agreements, and the set of service and agreement templates; the electronic device 102 may transmit, to the first node, a set of parameters and a service agreement associated with the first node. Based on the received service agreement, the electronic device 102 may generate an Application Programming Interface (API) key of a data hub for the MaaS network 100. The first node may be onboarded to the created MaaS node group of the MaaS network 100 based on the generated API key and the transmitted service agreement associated with the first node. The onboarding of the first node to the MaaS network is described further, for example, in FIGS. 2, 3, 4A, 4B, 5, 6, 7, 8, and 9.

Typically, there may be no streamlined processes to onboard users, organizations, and personnel associated with organizations, and the on-boarding may be an ad-hoc process. As such, the onboarding of a new user or a new organization to the MaaS network 100 may be a cumbersome and a time-consuming process that may require manual verification or authorization. For example, traditional on-boarding processes may require, manual authentication via emails or in person/physical verification. It may be appreciated that the MaaS platform 108 of the present disclosure may provide a streamlined and secure process to achieve onboarding of the user or the organization on the MaaS platform 108 or the MaaS network 100. The service catalog/agreement environment 108B may store a set of service and agreement templates. In an embodiment, a node may generate contracts or agreements, such as, a master service agreement (MSA) contract, terms of service (ToS) agreement, or a privacy policy (PP) agreement based on the storage of the set of service and agreement templates. For example, the generated set of service and agreement templates may be skeletal formats that may be generated for certain service agreements etc. For example, if two organizations want to establish a revenue share service, they may have to establish a service agreement between them for revenue sharing.

Figure 2:
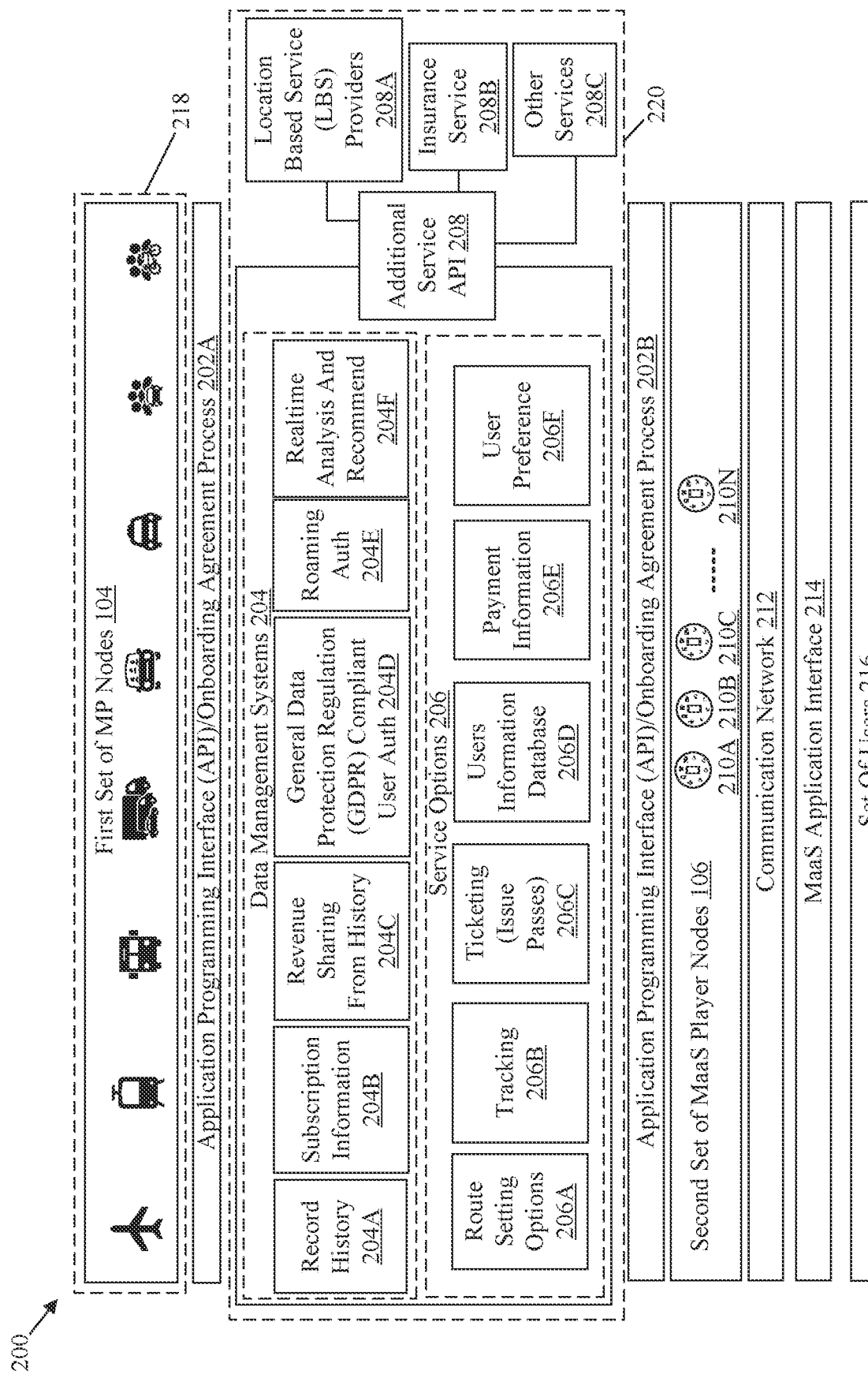
FIG. 2 is a block diagram that illustrates an exemplary layered architecture diagram of a mobility-as-a-service platform for secure onboarding of users and organizations on the MaaS platform, in accordance with an embodiment of the disclosure.

FIG. 2 is a block diagram that illustrates an exemplary layered architecture diagram of a mobility-as-a-service platform for secure onboarding of users and organizations on the MaaS platform, in accordance with an embodiment of the disclosure. FIG. 2 is explained in conjunction with elements from FIG. 1. With reference to FIG. 2, there is shown a layered architecture diagram 200. The layered architecture diagram 200 may include an application program interface (API)/onboarding agreement process 202A, an API/onboarding agreement process 202B, a data management system 204, a service options 206, an additional service API 208, a communication network 212, a MaaS application interface 214 (or MaaS API), and a set of users 216. The layered architecture diagram 200 may further include a physical operation layer 218 (including, for example, the first set of MP nodes 104), a MaaS layer 220, and a MaaS operators' layer 210, including MaaS operators 210A, 210B, . . . 210N (for example, the second set of MaaS player nodes 106).

The data management system 204 may be a layer associated with MaaS common data and business rules. The data management system 204 may include, for example, a record history 204A, information related to a subscription 204B, a system for revenue sharing from history 204C, a system for General Data Protection Regulation (GDPR) compliant user auth (authentication) 204D, a system for roaming auth (authentication) 204E, and a system for real-time analysis and recommendation 204F. The service options 206 may include, for example, a route setting option 206A, a system for tracking 206B, a system for ticketing 206C (for issue of tickets and passes), a user information database 206D, payment information 206E, and information related to user preference 206F. The additional service API 208 may include, for example, location-based service (LBS) providers 208A, an insurance service 208B, and other services 208C.

The layered architecture diagram 200 may correspond to the MaaS network 100, which may include a network of nodes, such as, a set of nodes, for example, the first set of MP nodes 104 (i.e., the physical operation layer 218) and the second set of MaaS player nodes 106 (i.e., the MaaS operators' layer 210). The MaaS network 100 may handle transactions (such as, transaction messages) for a MaaS mobility service associated with multiple mobility providers. In accordance with an embodiment, each of the first set of MP nodes 104 may be associated with a separate mobility provider of the MaaS network 100. The MaaS mobility service may be provided by homogeneous mobility providers (such as multiple cab ride provider companies or multiple rail companies) or heterogenous mobility providers through a homogenous group of devices, applications, or ticketing gates, or a heterogenous group of ticketing gates, applications, and Point of Sale (POS) devices. The MaaS mobility service may be a combination of individual service offerings of one or more homogenous or heterogeneous mobility providers. The MaaS mobility service may include, for example, a train service, a bus service, a taxi/cab service, a metro rail service, an air-plane service, a fleet service, a ride hailing service, a car sharing service, a carpool service, a car rental service, a bike sharing service, or a combination thereof.

The physical operation layer 218 and the MaaS operators' layer 210 may interface and communicate with a MaaS platform (associated with the MaaS layer 220), via the API/onboarding agreement process 202A and the API/onboarding agreement process 202B, respectively. An API may be an interface that may be expose certain services associated with predefined functions of a software component to other software packages or components. For example, the first set of MP nodes 104 (such as, a node for a train service, a bus service, a taxi/cab service, a metro rail service etc.) may be integrated or interfaced with the MaaS platform 108 (i.e., the MaaS layer 220), via the API/onboarding agreement process 202A. In another example, the second set of MaaS player nodes 106 (such as, a node for a first MaaS operator) may be integrated or interfaced with the MaaS platform 108 (i.e., the MaaS layer 220), via the API/onboarding agreement process 202B. The first set of MP nodes 104 and the second set of MaaS player nodes 106 may be onboarded with the MaaS platform 108 based on communication of the respective node with the MaaS platform 108, via the API/onboarding agreement process 202A and the API/onboarding agreement process 202B, respectively.

As shown in FIG. 2, the layered architecture diagram 200 may further include the data management system 204. The data management system 204 may be used for implementation of a data management policy function. The data management policy function may be based on a region or area of operation of a first MP, a first MaaS player, and/or a first MaaS network as a whole. The data management policy function may also be dependent on one or more legal requirements of the region or area, which may change from time-to-time. In addition, data retention and processing rules may be governed by fine-grained parameters in a service agreement. Examples of the fine-grained parameters may include data retention period, data analytics policy, a policy for data disclosure to third parties, treatment of personally identifiable information (PII), data hashing, and the like.

The data management system 204 may be used for implementation of policies associated with any of the record history 204A, the information related to the subscription 204B, the system for revenue sharing from history 204C, the system for GDPR compliant user auth 204D, the system for roaming auth 204E, and the system for real-time analysis and recommendation 204F. The record history 204A may correspond to a plurality of transaction records that may be associated with information, such as, ticketing information, subscription information, payment information, revenue sharing information, and/or mobility service information. Each of the plurality of transaction records may be recorded and stored in the first distributed ledger database 118. The information related to the subscription 204B may correspond to subscription information associated with users or riders. For example, the information related to the subscription 204B may include information such as date of subscription, end date of subscription, type of subscription plan, and the like. The system for revenue sharing from history 204C may be based on a plurality of transaction records stored on a first MP node or the first distributed ledger database 118.

The system for GDPR compliant user auth 204D may correspond to treatment of personally identifiable information (PII), as defined by government or compliance rules and policies. The GDPR may lay down certain guidelines that the organizations must follow which may limit how PII data can be used. The system for roaming auth 204E may correspond to information associated with a travelling user (such as, a roaming user). The transaction records may further be associated with the roaming user. For example, the roaming user may be a rider whose trip may be such that a first leg of the trip may be associated with a first MaaS player and a first MP, while a second leg of the trip may be associated with a second MaaS player and a second MP. The plurality of transaction records for the roaming user may be associated with information, such as, ticketing information, subscription information, payment information, revenue sharing information, and/or mobility service information.

In an embodiment, the record history 204A, the information related to the subscription 204B, and the revenue sharing from history 204C may correspond to a blockchain common database (DB). In an example, the blockchain common DB may be implemented as a set of nodes of the first distributed ledger database 118. In an embodiment, the system for GDPR compliant user auth 204D and the system for roaming auth 204E may be used for authentication of nodes and users based on decentralized identifiers or distributed identifiers (DIDs) and self-sovereign identities (SSI). The information related with the system for GDPR compliant user auth 204D and the system for roaming auth 204E may be stored as credential information in a decentralized identification (DID) blockchain database. In an example, the decentralized identification (DID) blockchain database may be implemented as a set of nodes of the second distributed ledger database 120.

The system for real-time analysis and recommendation 204F may provide a real-time analytics and recommendations based on one or more queries received from the set of nodes of the MaaS platform 108. The system for real-time analysis and recommendation 204F may store a first group of transaction records of a first plurality of transaction records associated with all the mobility providers of a first MaaS network (e.g., the MaaS network 100). The storage of the first group of transaction records may be based on a first data retention threshold and a first storage duration of first plurality of transaction records on the first MaaS node. For example, if the first data retention threshold is three days, all transaction records of the first plurality of transaction records, that have a storage duration (i.e., first storage duration) of three or more days at the first MaaS node, may be selected as the first group of transaction records at the first MaaS node. In an embodiment, the system for real-time analysis and recommendation 204F may be configured to store selected transaction records from the first group of transaction records, based on an aggregation logic. In an embodiment, the system for real-time analysis and recommendation 204F may receive (from the electronic device 102 or a server associated with the MaaS platform 108) one or more queries associated with the stored first group of transaction records.

The service options 206 may correspond to various services provided by the MaaS platform 108. The service options 206 may include at least one of the route setting option 206A, the system for tracking 206B, the system for ticketing 206C, the user information database 206D, the payment information 206E, and the information related to the user preference 206F. The route setting option 206A may correspond to a route that the MaaS platform 108 or the electronic device 102 selects for a trip of a rider. The trip may involve provision of a transportation service by multiple mobility providers, which may span multiple geographic regions. For example, the route may include a travel by train, bus, and taxi for travel from start point to destination point. The system for tracking 206B may correspond to tracking of user ticket transaction data, travel data etc. associated with transaction records that may include, but is not limited to, transaction data corresponding to a trip-leg associated with a first MP, from ticket data in each of the first set of transaction records. The system for ticketing 206C may correspond to a transit pass or a travel card that may be issued to users (such as passenger) that allows a passenger of the service to take either a predefined number of trips or unlimited trips for a predefined time-period. For example, the passenger may be issued a monthly transit pass or travel card to take unlimited number of trips for a time-period of one month. The user information database 206D may be configured to store information associated with user (such as passenger). The information associated with the user may include, but is not limited to name, age, gender, travel history, and the like. The payment information 206E may correspond to information associated with payment details and payment history of a user (such as passenger). The payment information may include, but is not limited to cost of ticket, amount spent within a predefined time-period, mode of payment, amount due, and the like. The information related to the user preference 206F may correspond to preferences associated with a user (such as a passenger). The information related to the user preference 206F may correspond to preferences of a user (such as a passenger) associated with transportation. For example, the passenger may have a preference related to a mode of travel, for example, via a bus, as compared to other modes of travel, such as, a train, an airplane.

The additional service API 208 may correspond to an API that may help to integrate additional services associated with MaaS platform 108. The additional service API 208 may include the LBS providers 208A, the insurance service 208B, and other services 208C. the LBS providers 208A may correspond to secondary services that may be based on location of the users. The LBS may correspond to services which utilize geographic information of the users to provide services or information to the users. For example, the LBS may include but is not limited to navigation service, advertisement service, location tracking service, location-based weather information service, and the like. The insurance service 208B may correspond to an insurance service that may cover different travel related risks for a rider. The insurance service 208B may include insurance cover for medical expenses, lost luggage, flight cancellations, and other losses that a traveler may incur in transit or during a trip. The other services 208C may correspond to other travel related services that may include, but is not limited only to hotels, restaurants, and theme parks.

The API/onboarding agreement process 202B may be used to integrate the second set of MaaS player nodes 106 with the MaaS layer 220. The second set of MaaS player nodes 106 may be associated with the first set of MP nodes 104 with the help of the API/onboarding agreement process 202A and API/onboarding agreement process 202B. The first set of MP nodes 104 may be associated with a certain mobility provider and may be communicatively coupled to MP node(s) of the respective mobility providers. For example, a first MP node may be associated with a first MP (and coupled to the first MP node) and a second MP node may be associated with a second MP (and coupled to the second MP node). In some scenarios, a single MP node may be associated with each MP node (of that single MP), which may be included in multiple node packages. In certain embodiments, the on-boarding process of an MP node may be executed by a central MP node (e.g., the electronic device 102) associated with the MP node, which may be associated with the same mobility provider as the MP node. In another embodiment, the on-boarding process of a MaaS player node may be executed by a central MaaS node (e.g., the electronic device 102) associated with the MaaS player node, which may be associated with the same MaaS player as the MaaS player node.

The communication network 212 may include a communication medium through which the set of nodes of the MaaS network 100 may communicate with one another. The communication network 212 may be one of a wired connection or a wireless connection. Examples of the communication network 212 may include, but are not limited to, the Internet, a cloud network, Cellular or Wireless Mobile Network (such as, Long-Term Evolution and 5th Generation (5G) New Radio (NR)), a satellite communication system (using, for example, a network including a set of low earth orbit satellites), a Wireless Fidelity (Wi-Fi) network, a Personal Area Network (PAN), a Local Area Network (LAN), or a Metropolitan Area Network (MAN). Various devices in the network environment 100 may be configured to connect to the communication network 212 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The layered architecture diagram 200 may further include the MaaS application interface (or MaaS API) 214. The MaaS API 214 may be used to facilitate interaction of the set of users 216 with the MaaS network 100. The set of users 216 may use a respective user device (not shown) to access nodes of the MaaS network 100. Examples of the user devices may include, but are not limited to, a computing device, a desktop, a personal computer, a laptop, a computer workstation, a tablet computing device, a smartphone, a cellular phone, a mobile phone, a wearable display, a utility device, a utility console, a smart television (TV), an augmented reality (AR)/virtual reality (VR)/mixed reality (MR) device, a head-mounted display (HMD) for utility, a heads-up display (HUD) for utility, smart glasses for utility, a mainframe machine, a server, and/or a consumer electronic (CE) device.

Figure 3:
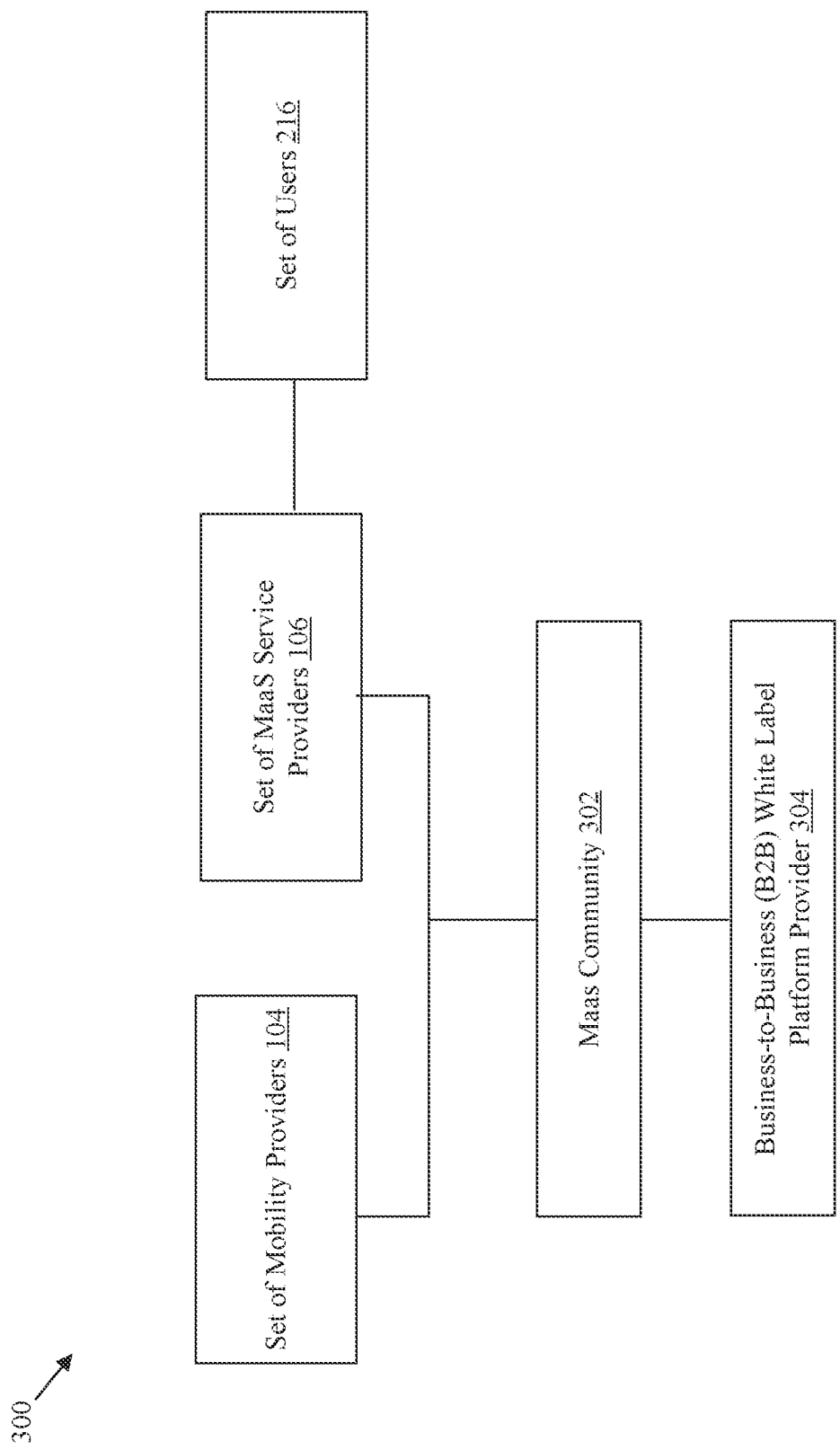
FIG. 3 is an exemplary block diagram that illustrates an onboarding agreement system, in accordance with an embodiment of the disclosure.

FIG. 3 is an exemplary block diagram that illustrates an onboarding agreement system, in accordance with an embodiment of the disclosure. FIG. 3 is explained in conjunction with elements from FIGS. 1 and 2. With reference to FIG. 3, there is shown an onboarding agreement system 300 that may include the first set of MP nodes 104, the second set of MaaS player nodes 106 of FIG. 1, and the set of users 216 of FIG. 2. The onboarding agreement system 300 may further include a MaaS community 302 and a Business-to-Business (B2B) white label platform provider 304. The first set of MP nodes 104 and the second set of MaaS player nodes 106 may be communicatively coupled with the MaaS community 302. Further, the MaaS community 302 may be communicatively coupled with the Business to Business (B2B) white label platform provider 304. The set of users 216 may be offered multi-modal travel services of the MaaS platform 108, through the second set of MaaS player nodes 106.

The electronic device 102 may be configured to receive a set of onboarding agreements from a set of nodes of a MaaS network (such as the MaaS network 100). The set of nodes may include at least one of a first set of mobility provider nodes (such as the first set of MP nodes 104) and a second set of MaaS player nodes (such as the second set of MaaS player nodes 106). The set of onboarding agreements may correspond to at least one of a master service agreement (such as the master service agreement), a terms-of-service agreement (such as the terms-of-service agreement), or a privacy policy agreement (such as the privacy policy agreement). In an example, the electronic device 102 may receive a service agreement and a privacy policy (PP) agreement from a MaaS player node (of the second set of MaaS player nodes 106) and may receive a terms-of-service (ToS) agreement and a privacy policy agreement from an MP node (of the first set of MP nodes 104). In another example, the electronic device 102 may receive a service agreement and a privacy policy agreement from an MP node (of the first set of MP nodes 104) and may receive a terms-of-service agreement (ToS) and a privacy policy (PP) agreement from a MaaS player node (of the second set of MaaS player nodes 106). A computing device of the set of users 216 may receive a service agreement, an end-user license agreement (EULA), and a privacy policy (PP) agreement from a MaaS player node associated with the MaaS player which offers a MaaS service to the respective user of the set of users 216.

The electronic device 102 may generate a set of service and agreement templates (such as, the set of service and agreement templates) based on the received set of onboarding agreements to create a MaaS node group (such as, the MaaS community or coalition 302) corresponding to the set of nodes. The set of service and agreement templates may be skeleton contract/agreement documents with pre-defined legal constructs for a certain use case or purpose (e.g., revenue sharing or data sharing). In an embodiment, the MaaS community 302 may be associated with the electronic device 102 (not shown in FIG. 3). For example, the MaaS community 302 may correspond to the MaaS node group created by the electronic device 102. In an embodiment, the MaaS community 302 may correspond to a MaaS common harmonization system that may be operated by a public authority, a government organization, a municipality, or a MaaS business community (including for example, MPs and MaaS players).

The electronic device 102 may transmit the received set of onboarding agreements and the generated set of service and agreement templates to the created MaaS node group (such as, the MaaS community 302). In an embodiment, the MaaS community 302 may generate the MSA, the TOS, and the PP. For example, the generated set of service and agreement templates may be skeletal formats that may be generated for certain service agreements etc. For example, if two organizations have to establish a revenue share service, the organization may be required to establish a service agreement between the organizations for revenue sharing. In an embodiment, the agreement template may be generated by the MaaS community 302.

In an embodiment, the B2B white label platform provider 304 may be a B2B service provider that may offer an online portal to provide a templatized travel solution to other businesses based on configurable MaaS services, through the MaaS network 100. In certain scenarios, the MaaS community 302 may receive a service agreement and a privacy policy agreement from the B2B white label platform provider 304. The received service agreement and privacy policy may be used by the MaaS community 302 to generate templatized service agreements, such as, service agreements for revenue sharing and service agreements associated with various subscription models.

The electronic device 102 may receive an onboarding request from a first node (for example, a MaaS player node of the second set of MaaS player nodes 106) of the MaaS network 100. In an example, the onboarding request may be received from the set of users 216 through the second set of MaaS player nodes 106. The electronic device 102 may further verify a DID of the first node based on the received onboarding request. For example, by using DID and Self Sovereign Identity (SSI), the electronic device 102 may verify the credentials of the first node. It may be appreciated that by verification of the credentials of the first node, an identity of the user or personnel associated with an organization may be authenticated. Further, based on verification of the first node, information associated with the user or the personnel associated with the organization may be stored at an identity provider (IDP). In addition, based on verification of the first node, an access to the MaaS platform 108 may be granted to the user or the personnel associated with the organization.

The electronic device 102 may be configured to transmit, to the first node, a set of parameters and a service agreement associated with the first node, based on the verified DID, transmitted set of onboarding agreements, and the set of service and agreement templates. For example, based on the granted access, the set of parameters, and the service agreement, the user or the personnel may generate service agreement by using the set of service and agreement templates that may have been generated by the MaaS community 302.

The electronic device 102 may transmit the service agreement associated with the first node to the created MaaS node group (such as, the MaaS community 302). Thereafter, the electronic device 102 may generate an API key of a data hub for the MaaS network 100, based on the received service agreement. The first node may be onboarded to the created MaaS node group (such as, the MaaS community 302) of the MaaS network 100 based on the generated API key and the transmitted service agreement associated with the first node. For example, the service agreements and the shared API keys may enable the first node to access the data hub of the MaaS network 100 and communicate with the other nodes of the MaaS network 100, and offer or consume MaaS services.

Figure 4A:
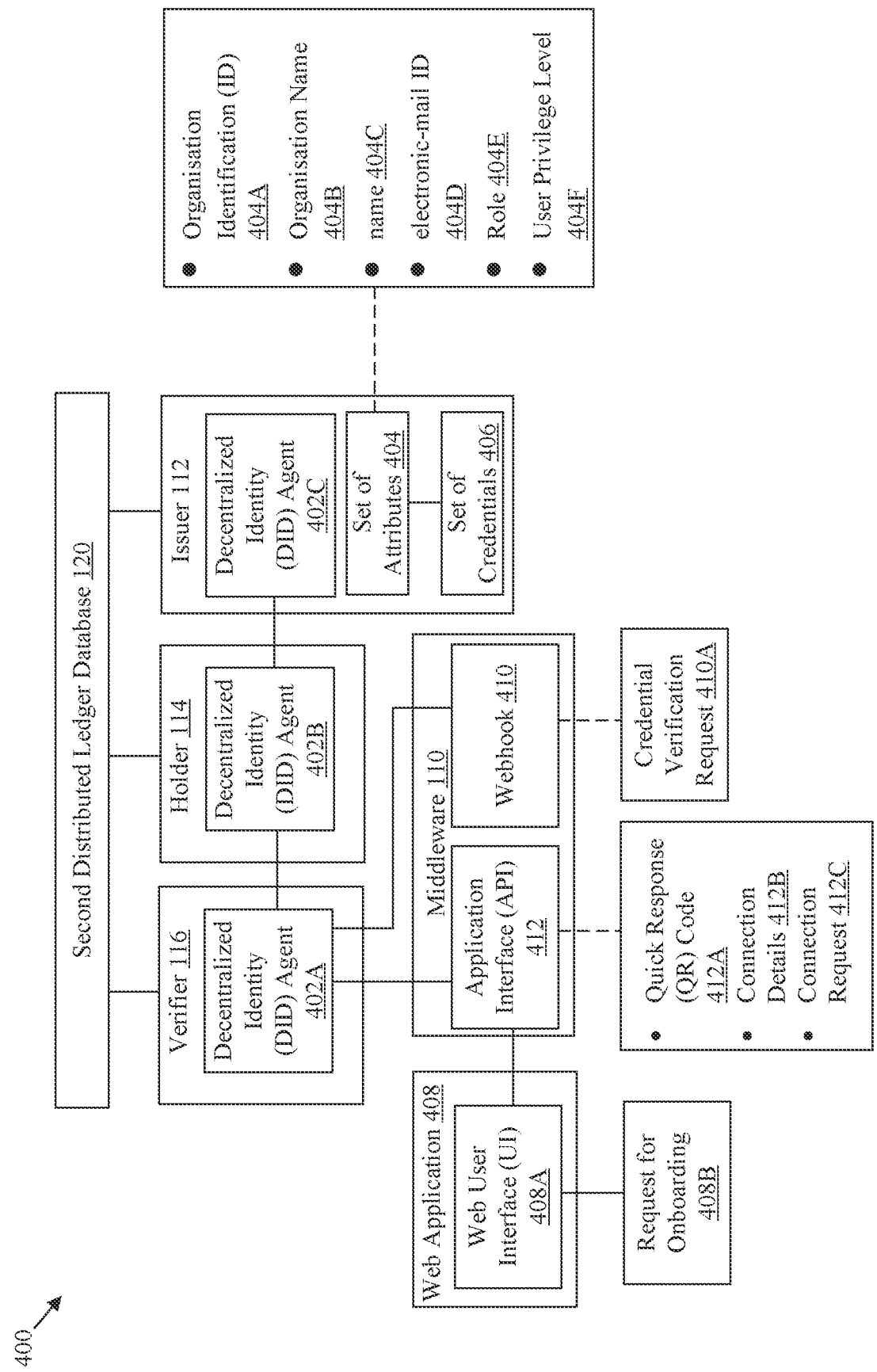
FIGS. 4A and 4B illustrate exemplary architecture for credential request and verification of a node to be onboarded to a MaaS network, in accordance with an embodiment of the disclosure.
Figure 4B:
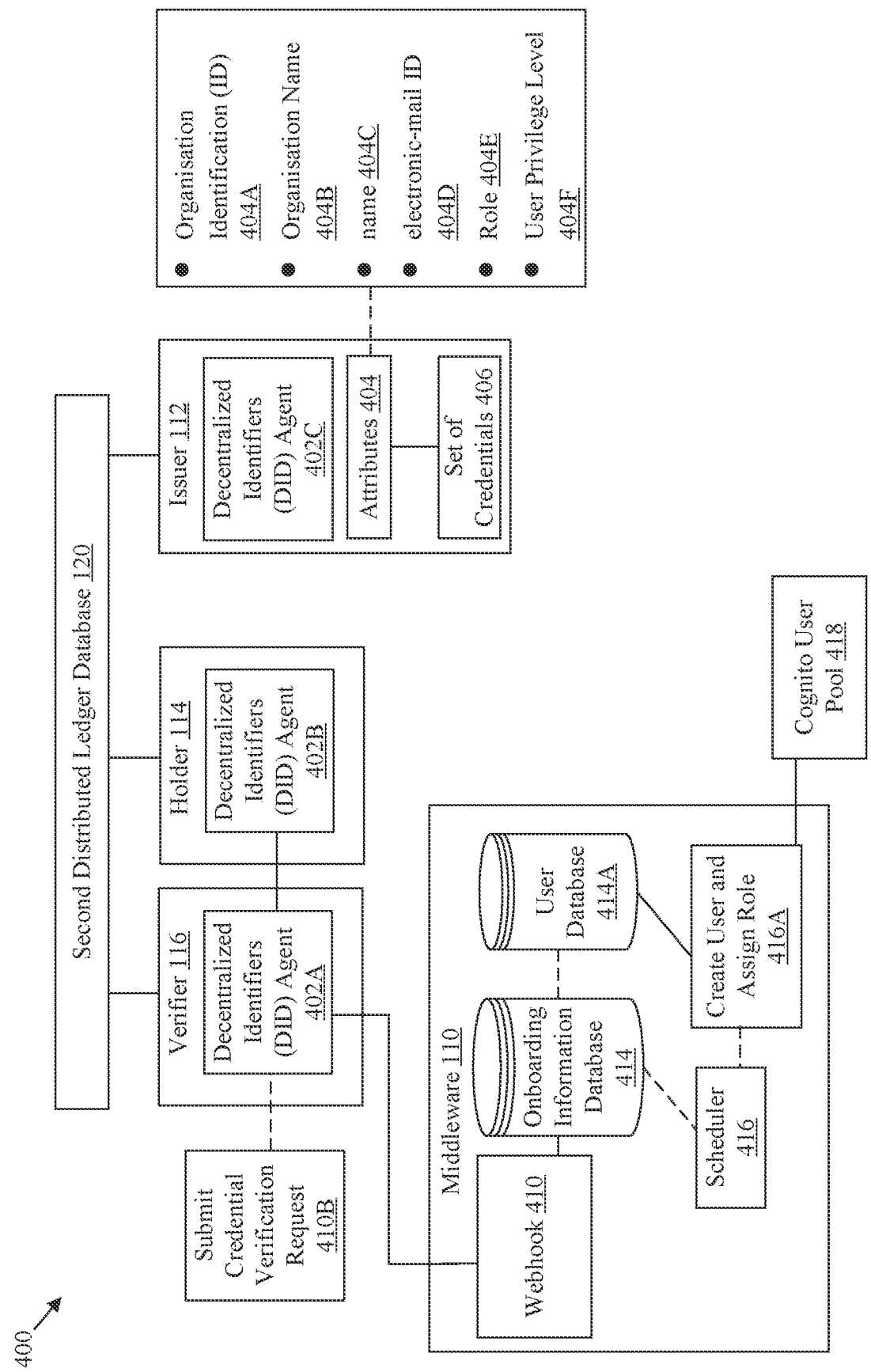

FIGS. 4A and 4B illustrate exemplary architecture for credential request and verification of a node to be onboarded to a MaaS network, in accordance with an embodiment of the disclosure. FIGS. 4A and 4B are explained in conjunction with elements from FIG. 1, FIG. 2, and FIG. 3. With reference to FIGS. 4A and 4B, there is shown an exemplary architecture 400 for credential request and verification of a node to be onboarded to a MaaS network (e.g., the MaaS network 100). The architecture 400 may include the middleware 110, the issuer node 112, the set of holder nodes 114, the verifier node 116, a web application 408, a webhook 410, and a Cognito user pool 418. In an embodiment, the middleware 110 may include the webhook 410 and an API 412. In another embodiment, the middleware 110 may include the webhook 410, an onboarding request database 414, a user database 414A, and a scheduler 416. The verifier node 116 may include a DID agent 402A. The set of holder nodes 114 may include a DID agent 402B. The issuer node 112 may include a DID agent 402C, a set of attributes 404, and a set of credentials 406. The web application 408 may include a web UI 408A.

Each of the issuer node 112, the set of holder nodes 114, and the verifier node 116 may be associated with the second distributed ledger database 120 and may include a corresponding DID agent. The DID agent 402C of the issuer node 112 may generate one or more credentials or credential templates that may be stored as the set of credentials 406. Further, the DID agent 402C of the issuer node 112 may define attributes that may correspond to the generated credentials. The attributes may be stored as the set of attributes 404. The set of attributes 404 may include, but is not limited to, an organization ID 404A, an organization name 404B, a name 404C (of an administrator user), an electronic-mail ID 404D (of an administrator user), a role 404E (of a user of a node), and a user privilege level 404F (of a user of a node). The issuer node 112 may be configured to generate credentials associated with each holder node of the set of holder nodes 114. The issuer node 112 may correspond to a government organization or a private organization such as, an entity associated with the MaaS community 302, that may issue credentials for nodes of the MaaS network 100.

With reference to FIG. 4A, the web UI 408A of the web application 408 may be configured to receive a user input from a user or a personnel of an organization to raise a request for onboarding 408B (of a node, such as, a first node). The user input may include any of selection of an option on the web UI 408A, or scan of a quick response (QR) code. The web application 408 may be accessed by the user or the personnel using a user device (such as, mobile device). The API 412 may receive the user input (such as, a QR code 412A) and information associated with the user device. The information associated with the user device may include type of device, type of connection, and the like. Further, the API 412 may process QR code 412A and submit a connection request 412C (including information, such as, connection details 412B) to the verifier node 116 through the middleware 110. The verifier node 116 may share an invitation for connection with the DID agent 402B of a relevant holder node (of the set of holder nodes 114) and receive a connection identifier, a DID, and a label associated with the first node.

The verifier node 116 may be configured to receive a credential verification request (e.g., a credential verification request 410A) associated with the first node, based on the received request for onboarding 408B of the first node. For example, based on the received connection identifier, the verifier node 116 may trigger (for example, an event associated with a credential verification request 410A) the webhook 410 to automatically transmit a request for credential verification to the verifier node 116. The webhook 410 may correspond to a call-back function or sub-routine for event triggered communication between applications. For example, the webhook 410 may correspond to a service that enables one node to send data to another node based on a triggering event. In current scenarios, the verifier node 116 may trigger an event (associated with the credential verification request 410A) on the webhook 410 based on the reception of the connection identifier by the verifier node 116. Based on the event triggered on the webhook 410, the webhook 410 may automatically transmit a credential verification request 410B (refer FIG. 4B) to the verifier node 116.

With reference to FIG. 4B, the verifier node 116 may be configured to query a holder node of the set of holder nodes 114 for verified credentials of the first node, based on the credential verification request 410B received from the webhook 410. Further, the verifier node 116 may be configured to receive, from the holder node, the verified credentials of the first node, based on the query. The DID of the first node may be verified based on the received verified credentials of the first node. Further, based on the verification of the first node, the first node may be onboarded to the created MaaS node group of the MaaS network 100. Further, based on the verified credentials of the first node, the verifier node 116 may be configured to trigger an event of onboarding of the first node, via the webhook 410. In an embodiment, the onboarding may further include generation of access or credentials for an identity provider (IDP) (such as, a Cognito user from a Cognito user pool 418). The IDP may correspond to a service that may be configured to store and manage identity, credentials etc., of users or personnel of an organization. The organizations may use the IDP service to allow personnel associated with the organization to connect to resources that may be necessary. The Cognito user of the Cognito user pool 418 may be configured to create a user profile and assign role (as denoted by 416A) of a new user. The onboarding request database 414 and the user database 414A may be used for storage of information associated with the created user profile and respective assigned role, and information associated with the onboarding of the first node.

The scheduler 416 may include suitable logic, circuitry, interfaces, and/or code that may be configured to generate a trigger event associated with creation of the user profile and assignment of the role (as denoted by 416A). In an embodiment, the trigger event may include verification of credentials of the first node. Examples of the scheduler 416 may include, but are not limited to, a smartphone, a cellular phone, a mobile phone, a mainframe machine, a server, a computer workstation, and/or any computing device with a schedule-based or an event-based triggering mechanism. In an embodiment, the electronic device 102 may further be configured to create a user profile and a role for the user profile, associated with the first node in the MaaS network 100. The creation of the user profile and the role may be based on the verified DID of the first node and the scheduler 416.

Figure 5:
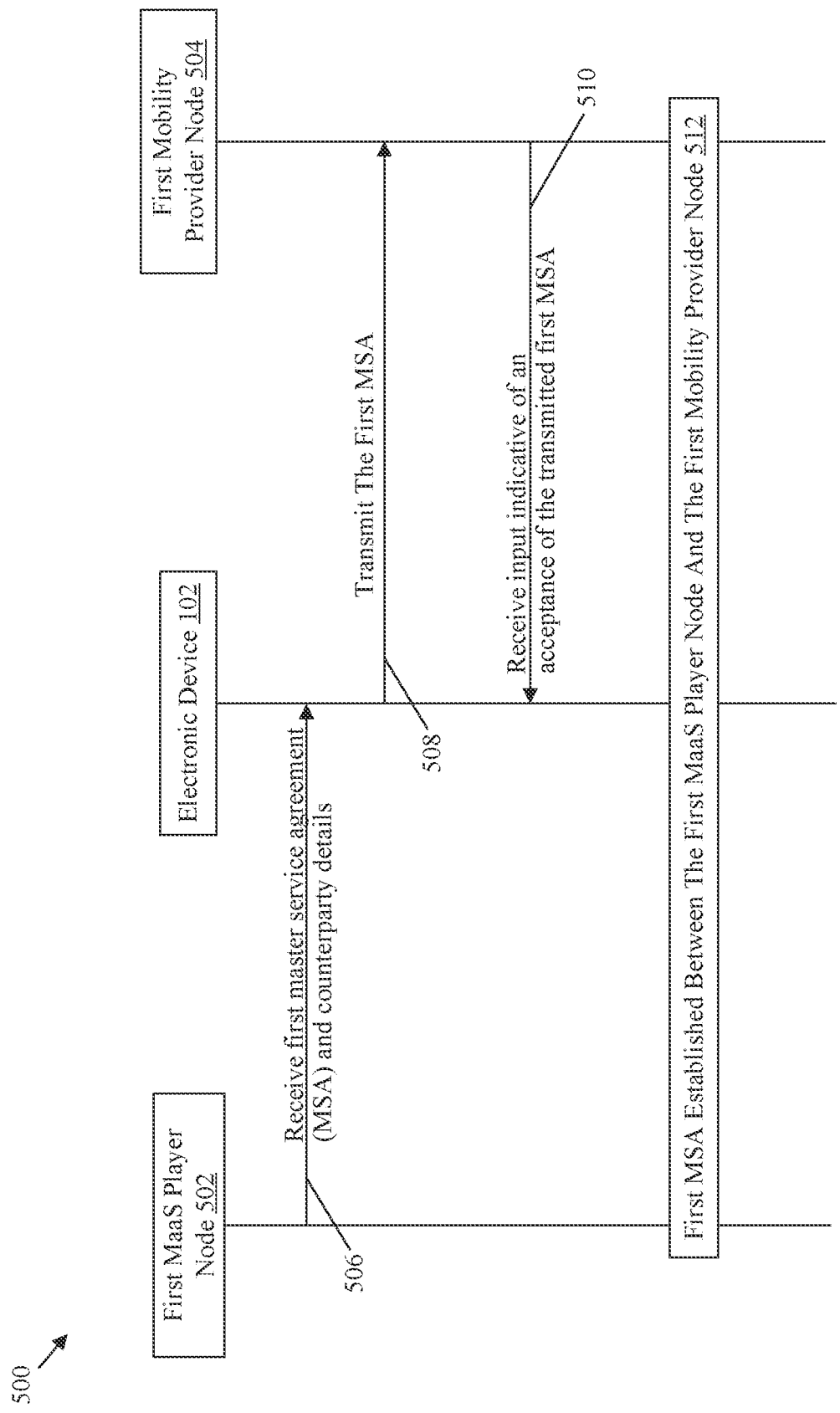
FIG. 5 is an exemplary sequence diagram that illustrates establishment of a master service agreement (MSA) between nodes of a Mobility-as-a-Service (MaaS) platform, in accordance with an embodiment of the disclosure.

FIG. 5 is an exemplary sequence diagram that illustrates establishment of a master service agreement (MSA) between nodes of a Mobility-as-a-Service (MaaS) platform, in accordance with an embodiment of the disclosure. FIG. 5 is explained in conjunction with elements from FIGS. 1, 2, 3, 4A, and 4B. With reference to FIG. 5, there is shown a sequence diagram 500 that illustrates a sequence of operations from 506 to 512. The sequence of operations may be executed by various nodes of the MaaS network 100 (such as, a first MaaS player node 502 of the second set of MaaS player nodes 106, the first mobility provider node 504 of the first set of MP nodes 104 of FIG. 5, and the electronic device 102 of FIG. 1).

At 506, a first master service agreement (MSA) and counterparty details may be received. The electronic device 102 may be configured to receive, from the first MaaS player node 502 of the second set of MaaS player nodes 106, the first master service agreement (MSA) and counterparty details associated with the first MaaS player node 502. The counterparty details may correspond to the first mobility provider node 504 of the first set of mobility provider nodes 104. In an embodiment, for onboarding a node on the MaaS network 100, the MSA may be established by the MaaS community 302. For example, the MSA may correspond to agreements that may need to be established between organizations that needs to share services such as, revenue, data, and logistic services.

At 508, the first MSA may be transmitted. The electronic device 102 may be configured to transmit, to the first mobility provider node 504, the first MSA, based on received the counterparty details. In an embodiment, the first MSA may be received and accepted by both the first MaaS player node 502 and the first mobility provider node 504 to initiate the services such as, data sharing, revenue sharing, and logistic services. In an embodiment, the MSA may be received from the first MaaS player node 502. The counterparty details may indicate that the MSA may be between a first MaaS player (associated with the first MaaS player node 502) and a first MP (associated with the first mobility provider node 504). The first MaaS player may be a first party and the first MP may be a counterparty to the MSA.

At 510, an input indicative of an acceptance of the transmitted first MSA may be received. The electronic device 102 may be configured to receive, from the first mobility provider node 504, the input indicative of an acceptance of the transmitted first MSA. For example, a user of the first mobility provider node 504 may provide an input indicative of acceptance or rejection of the first MSA.

At 512, the electronic device 102 may be configured to establish the first MSA between the first MaaS player node 502 and the first mobility provider node 504, based on the received input indicative of the acceptance of the transmitted first MSA. For example, if the first MaaS player and the first mobility provider intends to initiate a revenue share service, then both the first MaaS player and the first mobility provider may be required to receive and accept the first MSA. For example, the first MSA may facilitate an establishment of a legally-bound service contract between the first MaaS player and the first mobility provider based on an acceptance of the first MSA by both parties (i.e., the first MaaS player and the first mobility provider) of the MSA. Based on the establishment of the first MSA between both the parties (i.e., the first MaaS player and the first mobility provider), the parties may establish service agreements, and terms-of-service policies, to get on-boarded to the MaaS platform 108, as described further, for example, in FIGS. 6, 7, and 8.

Figure 6:
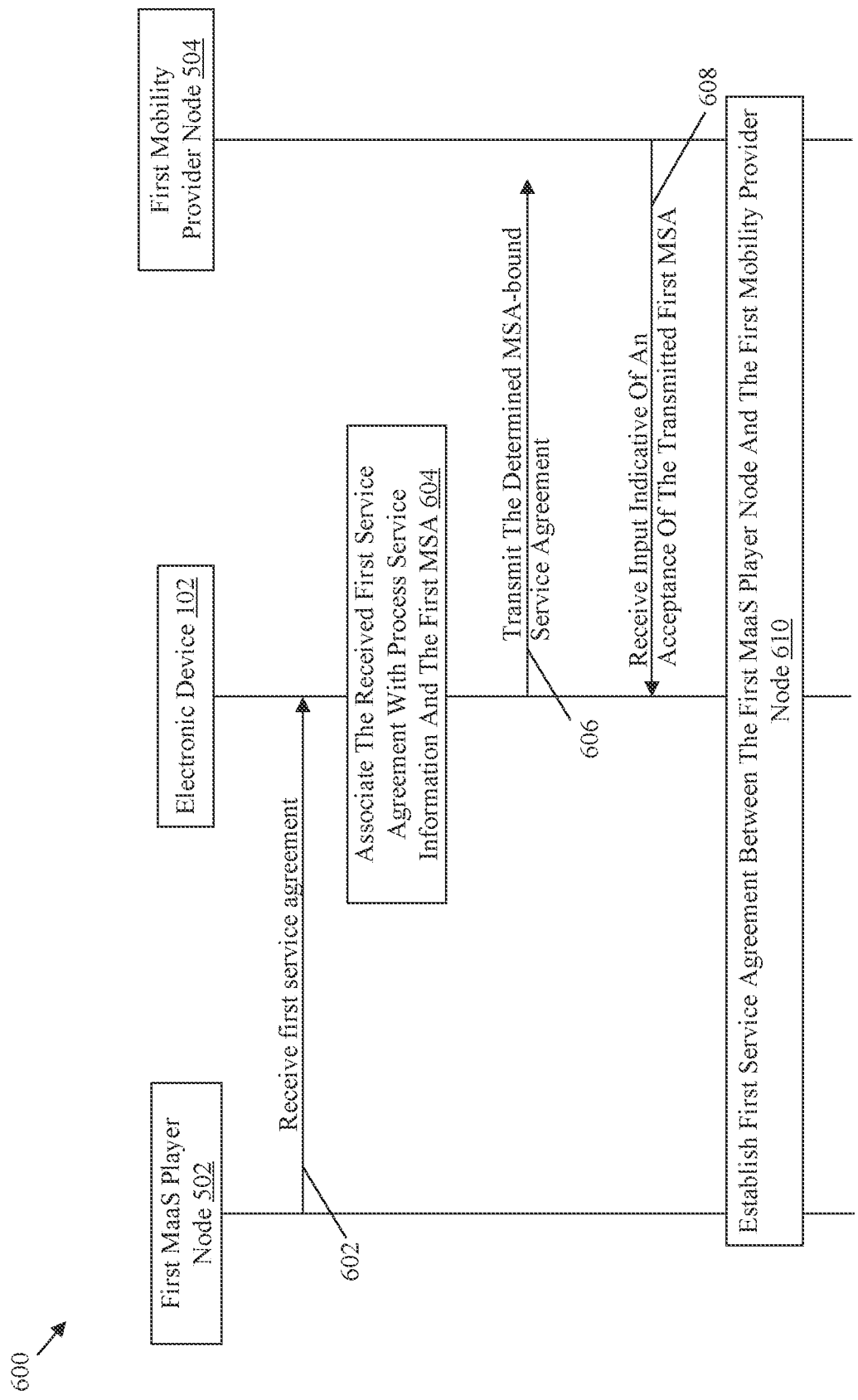
FIG. 6 is an exemplary sequence diagram that illustrates establishment of service agreement between nodes of a Mobility-as-a-Service (MaaS) platform, in accordance with an embodiment of the disclosure.

FIG. 6 is an exemplary sequence diagram that illustrates establishment of a service agreement between nodes of a Mobility-as-a-Service (MaaS) platform, in accordance with an embodiment of the disclosure. FIG. 6 is explained in conjunction with elements from FIGS. 1, 2, 3, 4A, 4B, and 5. With reference to FIG. 6, there is shown a sequence diagram 600 that illustrates a sequence of operations from 602 to 610. The sequence of operations may be executed by various nodes of the MaaS network 100 (such as, the first MaaS player node 502, the first mobility provider node 504 of FIG. 5, and the electronic device 102 of FIG. 1).

At 602, a first service agreement may be received. The electronic device 102 may be configured to receive, from the first MaaS player node 502, the first service agreement associated with the first MaaS player node 502. In an embodiment, a service agreement may correspond to a contract that may define terms and conditions of a services or revenue share arrangement between two or more organizations (such as, a MaaS player and a mobility provider).

At 604, the first service agreement and a process service may be associated. The electronic device 102 may be configured to associate the received first service agreement with process service information and the first MSA, to determine an MSA bound service agreement. For example, the first service agreement may correspond to contract or agreement between two parties, such as, the first MaaS player node 502 and the first mobility provider node 504, for MaaS services to be offered and a revenue sharing arrangement between the two parties. Further, the process service may correspond to processes or services that may be offered by the first MaaS player node 502 and the first mobility provider node 504. The first service agreement and process service may be associated with the MSA to determine the MSA bound service agreement. For example, the MSA-bound service agreement may correspond to the acceptance of the terms of agreement of the first MSA, as generated by the MaaS community 302, and service agreements as generated between the first MaaS player node 502 and the first mobility provider node 504.

At 606, an MSA-bound service agreement may be transmitted. The electronic device 102 may be configured to transmit, to the first mobility provider node 504, the determined MSA-bound service agreement. The MSA-bound service agreement may be received by the first mobility provider node 504.

At 608, an input indicative of an acceptance of the transmitted MSA-bound service agreement may be received. The electronic device 102 may be configured to receive, from the first mobility provider node 504, an input indicative of an acceptance of the transmitted MSA-bound service agreement. For example, the first mobility provider node 504 may accept the MSA-bound service agreement based on a user input indicative of the acceptance. Based on the acceptance of the MSA-bound service agreement, terms of the MSA-bound agreement may be enforceable.

At 610, the first service agreement may be established. The electronic device 102 may be configured to establish the first service agreement between the first MaaS player node 502 and the first mobility provider node 504, based on the received input indicative of the acceptance of the transmitted MSA-bound service agreement. For example, once parties such as, the first MaaS player node 502 and the first mobility provider node 504, have accepted the MSA-bound service agreement, the service agreement may be established between the parties and services such as, revenue sharing and data sharing, may be provisioned between the parties.

Figure 7:
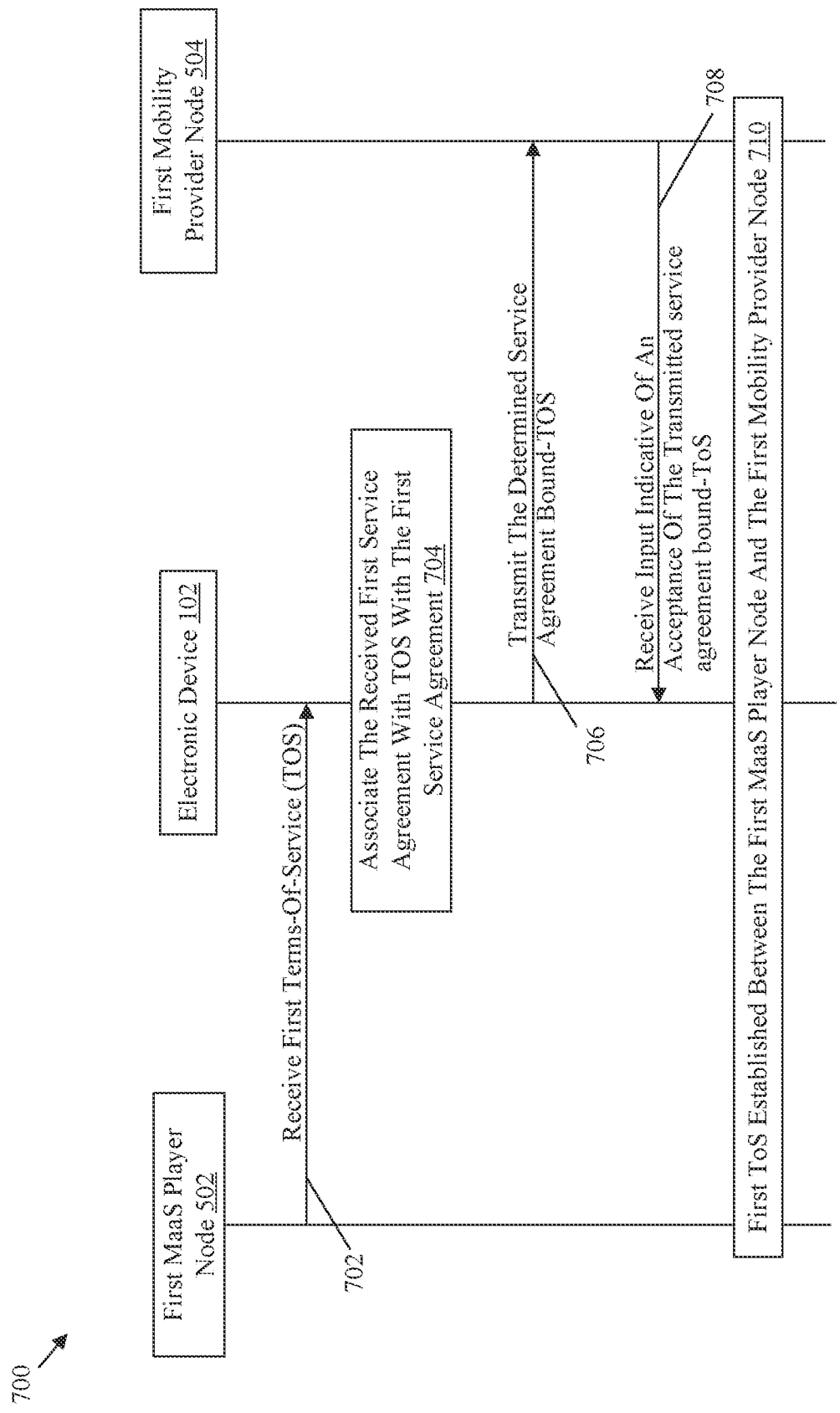
FIG. 7 is an exemplary sequence diagram that illustrates establishment of a first terms of service (ToS) between nodes of a Mobility-as-a-Service (MaaS) platform, in accordance with an embodiment of the disclosure.

FIG. 7 is an exemplary sequence diagram that illustrates establishment of a first terms of service (ToS) between nodes of a Mobility-as-a-Service (MaaS) platform, in accordance with an embodiment of the disclosure. FIG. 7 is explained in conjunction with elements from FIG. 1, FIG. 2, FIG. 3, FIG. 4A, FIG. 4B, FIG. 5, and FIG. 6. With reference to FIG. 7, there is shown a sequence diagram 700 that illustrates a sequence of operations from 702 to 710. The sequence of operations may be executed by various nodes of the MaaS network 100 (such as, the first MaaS player node 502, the first mobility provider node 504 of FIG. 5, and the electronic device 102 of FIG. 1).

At 702, a first terms of service (ToS) may be received. The electronic device 102 may be configured to receive, from the first MaaS player node 502, a first terms-of-service (ToS) associated with the first MaaS player node 502. The ToS may correspond to legal agreements between the first mobility provider node 504 and the first MaaS player node 502. Both the first MaaS player node 502 and the first mobility provider node 504 may be required to agree to abide by the terms of service for the enforcement of a related service agreement (e.g., the first service agreement).

At 704, the received first ToS and the first service agreement may be associated. The electronic device 102 may be configured to associate the received first ToS with the first service agreement to determine a service agreement bound-ToS. The first MaaS player node 502 and the first mobility provider node 504 may agree to abide by the ToS and the first service agreement, to establish the ToS between a first MaaS player (associated with the first MaaS player node 502) and a first MP node (associated with the first MP node 504).

At 706, the determined service agreement bound-ToS may be transmitted. The electronic device 102 may be configured to transmit, to the first mobility provider node 504, the determined service agreement bound-ToS. For example, the first mobility provider node 504 may accept the service agreement bound-ToS based on an input indicative of an acceptance of the ToS. Based on acceptance of the service agreement bound-ToS, the terms of the service agreement bound-ToS may be enforceable.

At 708, an input indicative of an acceptance of the transmitted service agreement bound-ToS may be received. The electronic device 102 may be configured to receive, from the first mobility provider node 504, an input indicative of an acceptance of the transmitted service agreement bound-ToS.

At 710, the first ToS may be established between the first MaaS player node 502 and the first mobility provider node 504. The electronic device 102 may be configured to establish the first ToS between the first MaaS player node 502 and the first mobility provider node 504, based on the received input indicative of the acceptance of the transmitted service agreement bound-ToS. Thus, the first ToS may be established between a first MaaS player (associated with the first MaaS player node 502) and a first MP (associated with the first mobility provider node 504). Based on the establishment of the first ToS, the first MaaS player node 502 and the first mobility provider node 504 may communicate with each other and other nodes of the MaaS platform 108, to offer or consume MaaS services associated with the MaaS platform 108.

Figure 8:
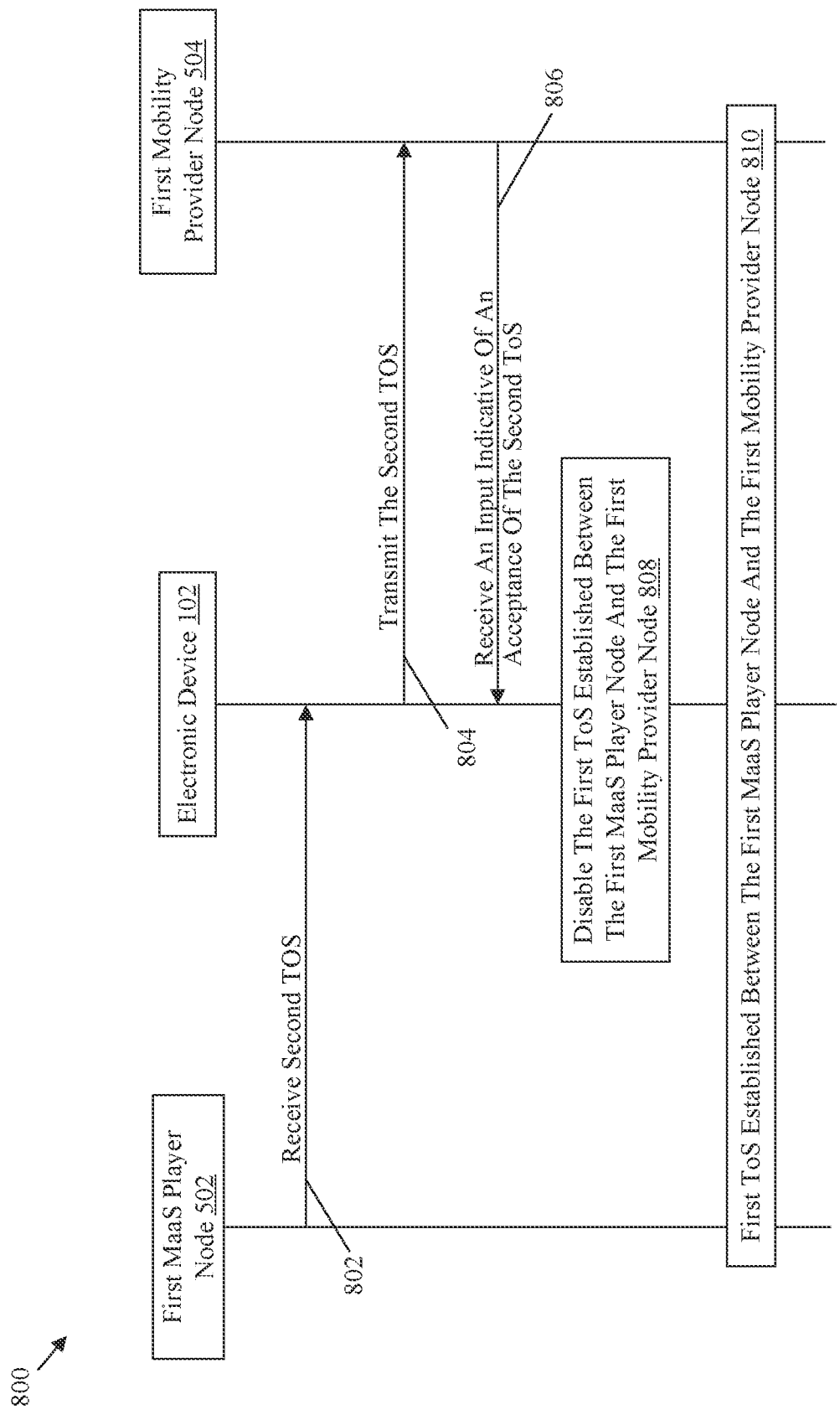
FIG. 8 is an exemplary sequence diagram that illustrates establishment of a second terms of service (ToS) between nodes of a Mobility-as-a-Service (MaaS) platform to override a previous version of ToS established between the nodes, in accordance with an embodiment of the disclosure.

FIG. 8 is an exemplary sequence diagram that illustrates establishment of a second terms of service (ToS) between nodes of a Mobility-as-a-Service (MaaS) platform to override a previous version of ToS established between the nodes, in accordance with an embodiment of the disclosure. FIG. 8 is explained in conjunction with elements from FIGS. 1, 2, 3, 4A, 4B, 5, 6, and 7. With reference to FIG. 8, there is shown a sequence diagram 800 that illustrates a sequence of operations from 802 to 808. The sequence of operations may be executed by various nodes of the MaaS network 100 (such as, the first MaaS player node 502, the first mobility provider node 504 of FIG. 5, and the electronic device 102 of FIG. 1).

At 802, a second ToS may be received. The electronic device 102 may be configured to receive, from the first MaaS player node 502, a second ToS associated with the first MaaS player node 502. The second ToS may correspond to a new version of the established first ToS.

At 804, the second ToS may be transmitted. The electronic device 102 may be configured to transmit, to the first mobility provider node 504, the received second ToS.

At 806, an input indicative of an acceptance of the second ToS may be received. The electronic device 102 may be configured to receive, from the first mobility provider node 504, an input indicative of an acceptance of the second ToS. For example, the input indicative of the acceptance of the second ToS may be received as a user input, via the first mobility provider node 504.

At 808, the first ToS established between the first MaaS player node 502 and the first mobility provider node 504 may be disabled. The electronic device 102 may be configured to disable the first ToS established between the first MaaS player node 502 and the first mobility provider node 504, based on the received input indicative of the acceptance of the second ToS.

At 810, the second ToS may be established. The electronic device 102 may be configured to establish the second ToS between the first MaaS player node 502 and the first mobility provider node 504, based on the disablement of the first ToS. Thus, once the first ToS (i.e., a previous version of ToS) established between two parties, such as, the first MaaS player node 502 and the first mobility provider node 504 is disabled, the electronic device 102 may establish the second ToS (i.e., a new version of ToS) between the parties, based on the acceptance of the second ToS by both the parties. The newly established second ToS may override a previous version of ToS (e.g., the first ToS). For example, the terms of service between various parties (e.g., MaaS players and mobility providers) of the MaaS platform 108 may be updated easily from time-to-time, based on various requirements, such as, legal, contractual, or service requirements.

Figure 9:
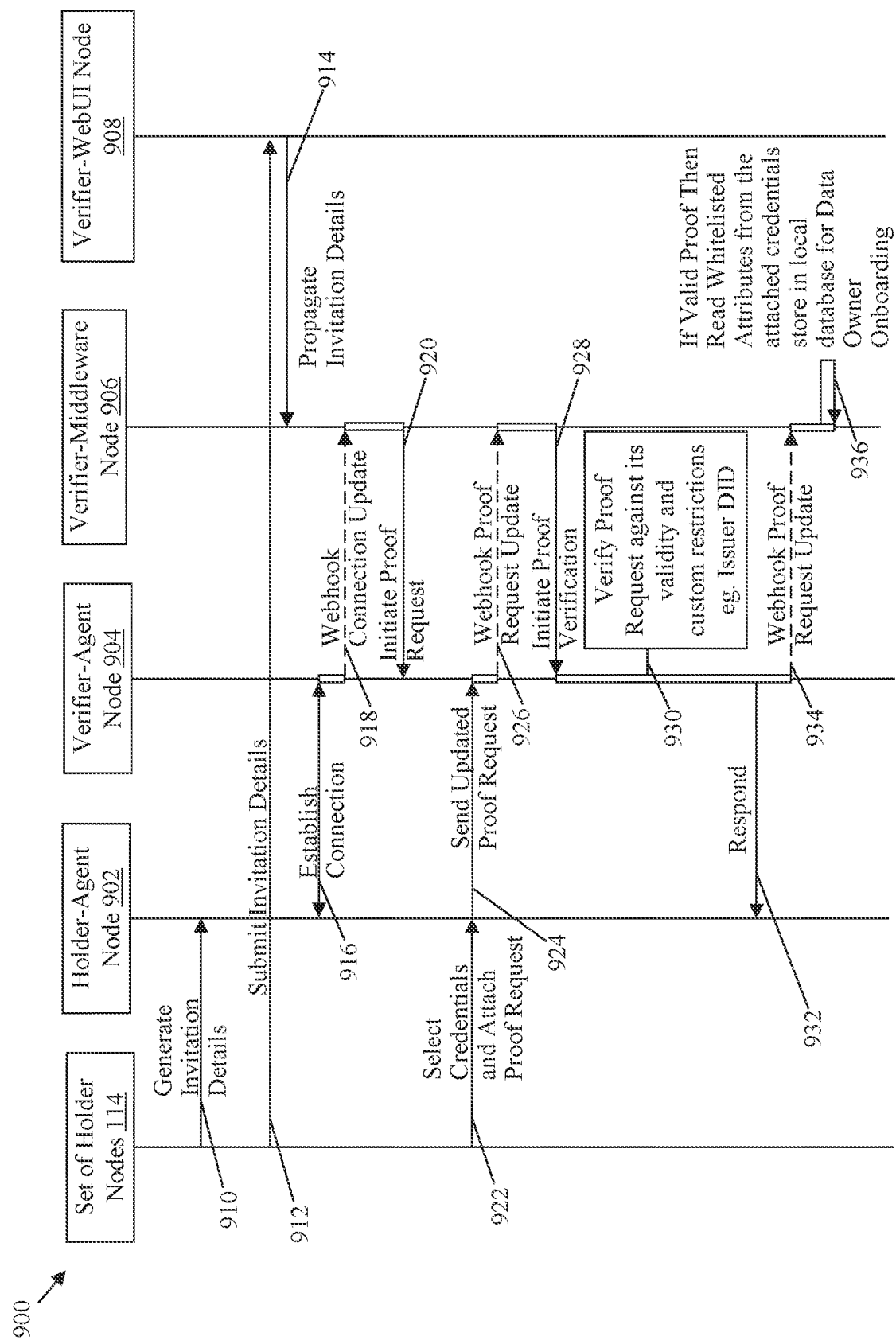
FIG. 9 is an exemplary sequence diagram that illustrates secure onboarding of users and organizations on a mobility-as-a-service (MaaS) platform, in accordance with an embodiment of the disclosure.

FIG. 9 is an exemplary sequence diagram that illustrates secure onboarding of users and organizations on a mobility-as-a-service (MaaS) platform, in accordance with an embodiment of the disclosure. FIG. 9 is explained in conjunction with elements from FIGS. 1, 2, 3, 4A, 4B, 5, 6, 7 and 8. With reference to FIG. 9, there is shown a sequence diagram 900 that illustrates a sequence of operations from 910 to 936. The sequence of operations may be executed by various nodes of the MaaS network 100 (such as, a holder-agent node 902, a verifier-agent node 904, a verifier-middleware node 906, a verifier-web UI node 908 of FIG. 9, and the set of holder nodes 114 of FIG. 1).

At 910, invitation details may be generated. In an embodiment, the set of holder nodes 114 may be configured to generate the invitation details. The invitation details may correspond to onboarding of a first node to the MaaS network 100. The generated invitation details may be transmitted to the holder-agent node 902.

At 912, the generated invitation details may be submitted. In an embodiment, the set of holder nodes 114 may submit the invitation details. The submitted invitation details may be transmitted to the verifier-webUI node 908, for example, a platform owner (such as a MaaS operator).

At 914, the invitation details may be propagated. In an embodiment, the verifier-webUI node 908 may propagate the invitation details through the verifier-middleware node 906. The verifier-webUI node 908 may transmit the invitation details to the verifier-agent node 904 through the verifier-middleware node 906.

At 916, based on the reception of the propagated invitation details, a connection may be established between the holder-agent node 902 and the verifier-agent node 904. In an example, the connection may be a synchronous serial interface (SSI) connection.

At 918, based on the connection established between the holder-agent node 902 and the verifier-agent node 904, a connection to the webhook 410 may be triggered. In an embodiment, the webhook 410 may be triggered by the verifier-agent node 904. To trigger the connection, the verifier-agent node 904 may transmit a webhook connection update to the verifier-middleware node 906.

At 920, a proof request may be initiated. The proof request may be transmitted from the verifier-middleware node 906 to the verifier-agent node 904. In an embodiment, the proof request may be initiated for verification of credentials associated with the verifier-webUI node 908.

At 922, credentials may be selected for verification and the selected credentials may be attached to the proof request. In an embodiment, the set of holder nodes 114 may select the credentials for verification. Further, the selected credentials may be attached to the proof request. The proof request may be transmitted from the set of holder nodes 114 to the holder-agent node 902.

At 924, the updated proof request may be transmitted from the holder-agent node 902 to the verifier-agent node 904. The holder-agent node 902 may transmit (or forward) the updated proof request (i.e., the proof request including the selected credentials) to the verifier-agent node 904.

At 926, based on the reception of the updated proof request at the verifier-agent node 904, the webhook 410 may be triggered. The verifier-agent node 904 may trigger the webhook 410 based on the reception of the updated proof request. Based on trigger of the webhook 410, a webhook proof request update may be transmitted from the verifier-agent node 904 to the verifier-middleware node 906.

At 928, a proof verification request may be initiated. The verifier-middleware node 906 may initiate the proof verification request. The credentials of the verifier-webUI node 908 may be verified based on the received proof request.

At 930, a proof request may be verified against its validity and custom restrictions. The verifier-agent node 904 may verify the proof request (i.e., the proof verification request) based on validity of the proof request and custom restrictions, such as, a decentralized/distributed ID (DID) of an issuer node.

At 932, a response may be transmitted. The verifier-agent node 904 may transmit the response to the holder-agent node 902. The response may correspond to the updated proof request transmitted (at 924) by the holder-agent node 902.

At 934, a webhook proof update request update may be transmitted. The webhook proof update request may be transmitted from the verifier-agent node 904 to the verifier-middleware node 906, based on the verification of the credentials.

At 936, based on verification and the webhook proof update, if the proof is determined as valid, the first node may be onboarded. The verifier-middleware node 906 may determine whether the proof (associated with the webhook proof update) is valid, based on the verification of the credentials (at 934). In case the proof is determined as valid, the verifier-middleware node 906 may retrieve (or read) whitelisted attributes from the attached credentials (included, for example, in the webhook proof update). The whitelisted attributes and the attached credentials may be stored in a local database associated with a data owner (for example, an owner of the first node). Thus, private information or sensitive details of the data owners may be stored locally thereby maintaining privacy and confidentiality of the data owners. Based on the validity of the credentials of the first node, the first node may be onboarded on the MaaS platform 108. The first node may receive an API key related to a data hub associated with the MaaS community 302, based on the onboarding of the first node on the MaaS platform 108. Further, based on the onboarding, the first node may be communicably coupled to other nodes of the MaaS network 100 and may participate in MaaS transactions to offer and/or consume MaaS services, through the MaaS platform 108. Typically, for a MaaS platform, there may be no streamlined process to onboard the various entities, such as, users, organizations, and personnel associated with organizations. The onboarding of a new user or a new organization to a MaaS platform may be a cumbersome and a time-consuming process that may require manual verification or authorization. For example, manual verification of new users through email may be required. In such case, the onboarding process may be an ad-hoc process. During the onboarding process, sensitive information (such as, name, email address, or organization name etc.) associated with the user, the organization, or the personnel associated with the organization may be available to third party administrators of the MaaS platform. The availability of such sensitive information to the third parties may give rise to confidentiality and privacy concerns.

The disclosed electronic device 102 may receive an onboarding request from a first node (such as the first node) of the MaaS network 100 (or the MaaS platform 108). Based on the received onboarding request, a decentralized identity (DID) (such as the DID) of the first node may be verified. Further, based on the verified DID, transmitted set of onboarding agreements, and the set of service and agreement templates, a set of parameters and a service agreement associated with the first node may be transmitted to the first node. Further, the electronic device 102 may transmit the service agreement associated with the first node to the created MaaS node group (e.g., the MaaS community 302). Thereafter, based on the received service agreement, an Application Programming Interface (API) key of a data hub for the MaaS network 100 may be generated. Thus, the first node may be onboarded to the created MaaS node group of the MaaS network 100 based on the generated API key and the transmitted service agreement associated with the first node. For example, the first node, that may correspond to any computing device of a user, an organization, or personnel associated with the organization, may be onboarded based on generation of the API key and transmission of the service agreements. Further, the API key may be used by the onboarded user (or the organization, or personnel associated with the organization) to share data (such as, revenue data, travel data, cyclic revenue, or travel data). Thus, a streamlined and secure on-boarding of new nodes to the MaaS platform may be achieved without concerns related to confidentiality and privacy of various entities (such as, the users/organizations/personnel) to be on-boarded, as the private information or sensitive information of data owners (i.e., users of the entities) may only be stored locally. After an entity is successfully on-boarded to the MaaS platform, the entity may start to communicate with the other entities of the MaaS platform 108 and offer service (for example, in case of MaaS player nodes or mobility provider nodes) or consume services (for example, in case of end-users or mobility provider nodes) associated with the MaaS platform 108.

Figure 10:
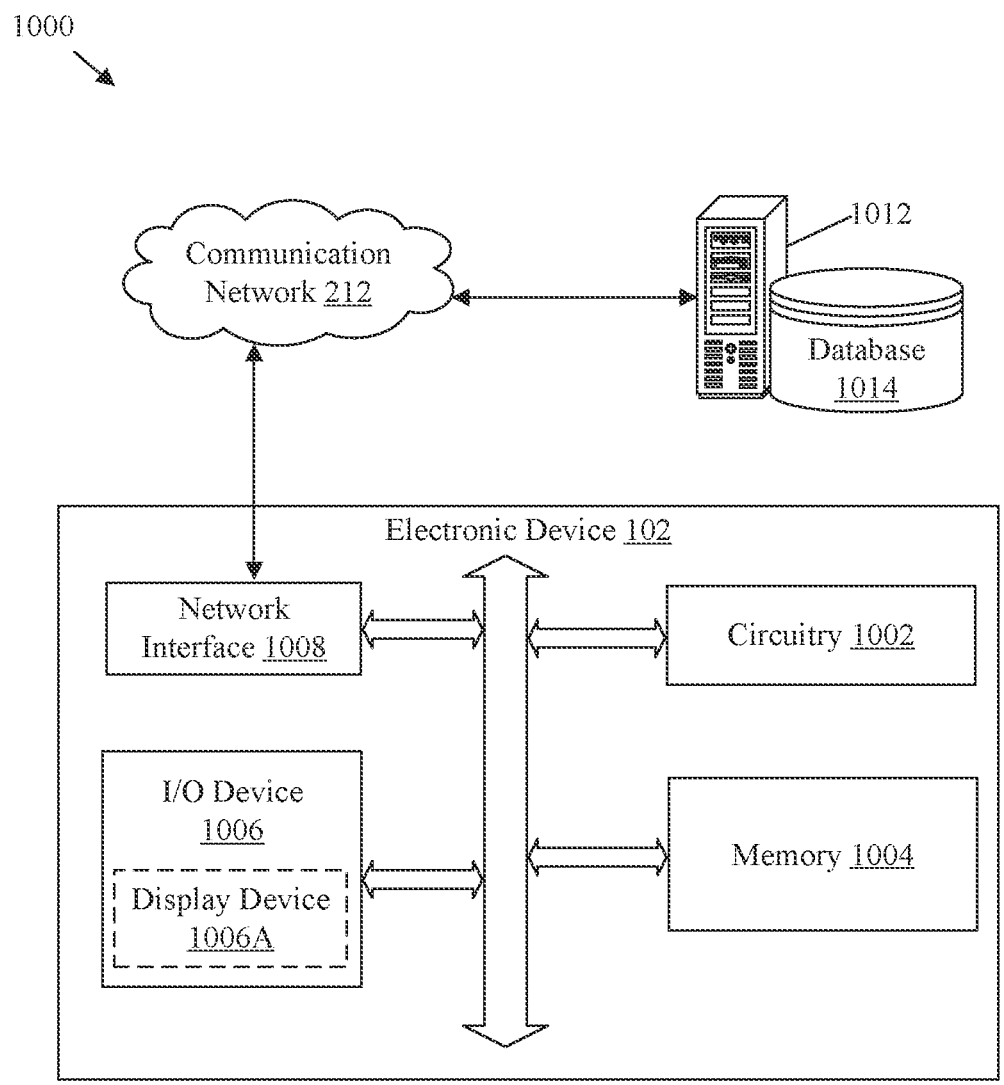
FIG. 10 is a block diagram that illustrates an exemplary electronic device of FIG. 1, in accordance with an embodiment of the disclosure.

FIG. 10 is a block diagram that illustrates an exemplary electronic device of FIG. 1, in accordance with an embodiment of the disclosure. FIG. 10 is explained in conjunction with elements from FIG. 1, FIG. 2, FIG. 3, FIG. 4A, FIG. 4B, FIG. 5, FIG. 6, FIG. 7, FIG. 8, and FIG. 9. With reference to FIG. 10, there is shown the exemplary electronic device 102. The electronic device 102 may include circuitry 1002, a memory 1004, an input/output (I/O) device 1006, and a network interface 1008. The input/output (I/O) device 1006 may include a display device 1006A. The network interface 1008 may connect the electronic device 102 with the first distributed ledger database 118 and the MaaS platform 108, via the communication network 212.

The circuitry 1002 may include suitable logic, circuitry, and/or interfaces that may be configured to execute program instructions associated with different operations to be executed by the electronic device 102. The operations may include reception of the set of onboarding agreements, generation of the set of service and agreement templates, transmission of the received set of onboarding agreements and the generated set of service and agreement templates, reception of the onboarding request, verification of the DID, transmission of the set of parameters and the service agreement, transmission of the service agreement and generation of the API key. The circuitry 1002 may include one or more processing units, which may be implemented as a separate processor. In an embodiment, the one or more processing units may be implemented as an integrated processor or a cluster of processors that perform the functions of the one or more specialized processing units, collectively. The circuitry 1002 may be implemented based on a number of processor technologies known in the art. Examples of implementations of the circuitry 1002 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 1004 may include suitable logic, circuitry, interfaces, and/or code that may be configured to store one or more instructions to be executed by the circuitry 1002.

The one or more instructions stored in the memory 1004 may execute different operations of the circuitry 1002 (and/or the electronic device 102). The memory 1004 may be configured to store information related to the set of nodes. Further, the memory 1004 may store credential information and information related to the second set of MaaS player nodes 106, the MaaS platform 108, the issuer node 112, the set of holder nodes 114, the verifier node 116, and each of the first distributed ledger database 118. Examples of implementation of the memory 1004 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 1006 may include suitable logic, circuitry, interfaces, and/or code that may be configured to receive an input and provide an output based on the received input. For example, the I/O device 1006 may receive an input indicative of acceptance of the first MSA, the MSA-bound service agreement, the service agreement bound-ToS, and the second ToS. The I/O device 1006 may be further configured to display a user-interface associated with the onboarding of a node (e.g., the first node) on the MaaS platform 108. The I/O device 1006 may include various input and output devices, which may be configured to communicate with the circuitry 1002. The I/O device 1006 may include the display device 1006A. Examples of the I/O device 1006 may include, but are not limited to, a touch screen, the display device 1006A, a keyboard, a mouse, a joystick, a microphone, or a speaker. Examples of the I/O device 1006 may further include braille I/O devices, such as, braille keyboards and braille readers.

The network interface 1008 may include suitable logic, circuitry, interfaces, and/or code that may be configured to facilitate communication between the electronic device 102, the first distributed ledger database 118, and the MaaS platform 108. The network interface 1008 may be implemented by use of various known technologies to support wired or wireless communication of the electronic device 102 with the communication network. The network interface 1008 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 1008 may be configured to communicate via wireless communication with networks, such as the Internet, an Intranet, a wireless network, a cellular telephone network, a wireless local area network (LAN), or a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), $5^{th}$ Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The display device 1006A may include suitable logic, circuitry, and interfaces that may be configured to display the web UI 408A. The display device 1006A may be a touch screen which may enable a user to provide a user-input via the display device 1006A. The touch screen may be at least one of a resistive touch screen, a capacitive touch screen, or a thermal touch screen. The display device 1006A may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 1006A may refer to a display screen of a head mounted device (HMD), a smart-glass device, a see-through display, a projection-based display, an electro-chromic display, or a transparent display. Various operations of the circuitry 202 for secure onboarding of users and organizations on a mobility-as-a-service (MaaS) platform are described further, for example, in FIGS. 3, 4A, 4B, 5, 6, 7 8, and 9.

Figure 11:
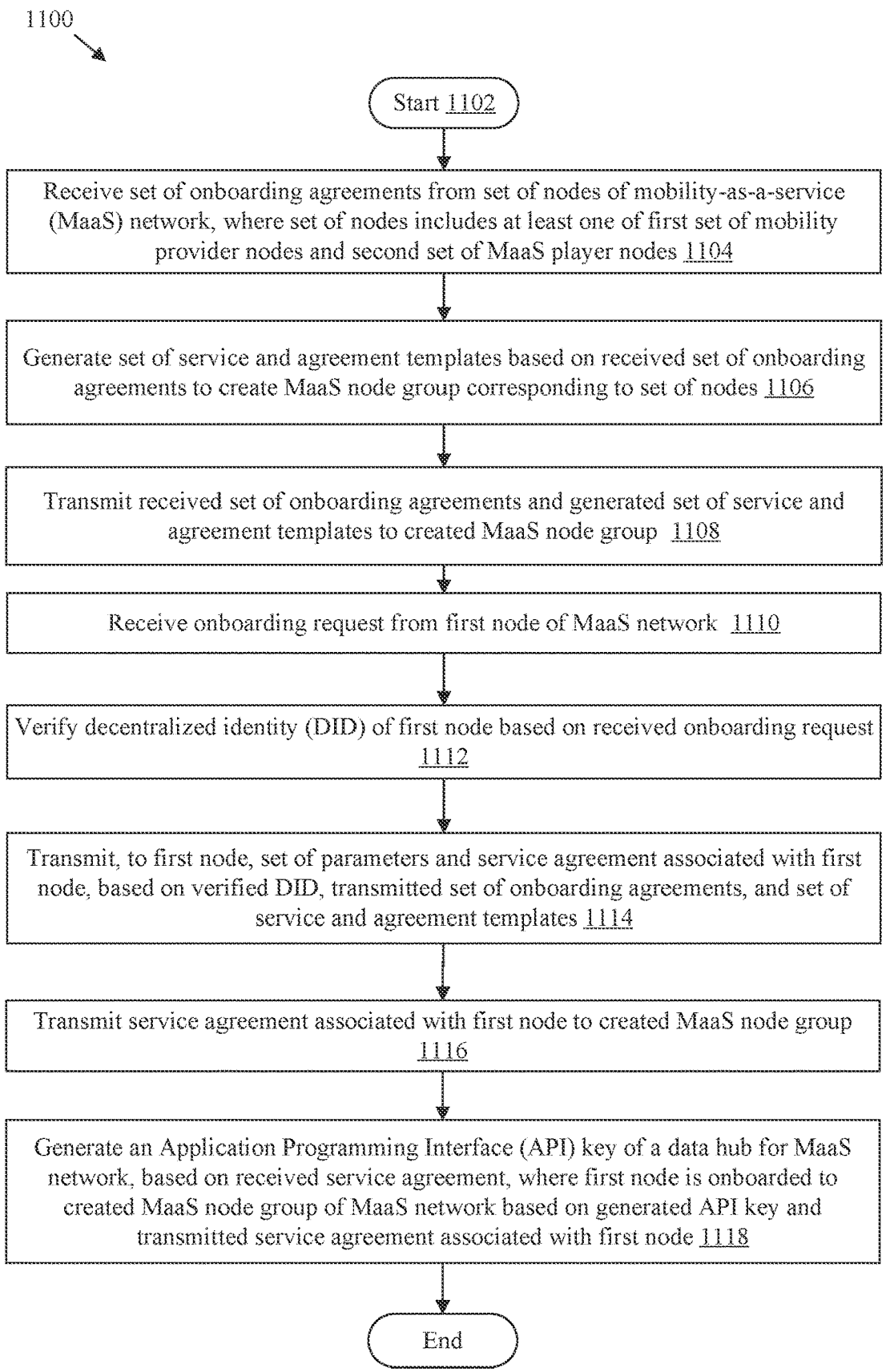
FIG. 11 is a flowchart that illustrates operations of an exemplary method for secure onboarding of users and organizations on a mobility-as-a-service (MaaS) platform, in accordance with an embodiment of the disclosure.

FIG. 11 illustrates an exemplary flowchart of a method for secure onboarding of users and organizations on a mobility-as-a-service (MaaS) platform, in accordance with an embodiment of the disclosure. FIG. 11 is described in conjunction with elements from FIGS. 1, 2, 3, 4A, 4B, 5, 6, 7, 8, 9 and 10. With reference to FIG. 11, there is shown a flowchart 1100. The exemplary method of the flowchart 1100 may be executed by any computing system, for example, by the electronic device 102 of FIG. 1, the first set of MP nodes 104 or other MP nodes (e.g., a central MP node) of FIG. 1, and/or the second set of MaaS player nodes 106 or other MaaS player nodes (e.g., a central MaaS player node) of FIG. 1. The exemplary method of the flowchart 1100 may start at 1102 and proceed to 1104.

At 1104, the set of onboarding agreements may be received from a set of nodes of a mobility-as-a-service (MaaS) network. The circuitry 1002 may be configured to receive a set of onboarding agreements from a set of nodes of a mobility-as-a-service (MaaS) network (e.g., the MaaS network 100). The set of nodes may include at least one of a first set of mobility provider nodes (such as the first set of MP nodes 104) and a second set of MaaS player nodes (such as the second set of MaaS player nodes 106). The set of onboarding agreements may correspond to at least one of a master service agreement (such as the master service agreement), a terms-of-service agreement (such as the terms-of-service agreement), or a privacy policy agreement (such as the privacy policy agreement). In an example, the set of onboarding agreements may be received from the second set of MaaS player nodes 106. The MaaS network 100 may further include at least one of an issuer node (such as, the issuer node 112) associated with a credential issuing authority, a set of holder nodes (such as, the set of holder nodes 114) corresponding to the set of nodes, a verifier node (such as, the verifier node 116) associated with a MaaS network (such as, the MaaS network 100) owner, and distributed ledger databases (such as, the first distributed ledger database 118 and the second distributed ledger database 120).

At 1106, the set of service and agreement templates may be generated based on the received set of onboarding agreements to create a MaaS node group corresponding to the set of nodes. The circuitry 1002 may be configured to generate a set of service and agreement templates (such as, the set of service and agreement templates) based on the received set of onboarding agreements to create a MaaS node group (such as, the MaaS community 302) corresponding to the set of nodes. The generation of the set of service and agreement templates and creation of the MaaS node group are described further, for example, in FIGS. 1 and 3.

At 1108, the received set of onboarding agreements and the generated set of service and agreement templates may be transmitted to the created MaaS node group. The circuitry 1002 may be configured to transmit the received set of onboarding agreements and the generated set of service and agreement templates to the created MaaS node group (such as, the MaaS community 302). In an embodiment, the MaaS community 302 may generate the MSA, the ToS, and the PP. For example, the generated set of service and agreement templates may be skeletal formats that may be generated for certain service agreements etc. For example, if two organizations are to establish a revenue share service, the organizations may be required to establish a service agreement between the organizations for revenue sharing. In an embodiment, the agreement templates may be generated by the MaaS community 302.

At 1110, an onboarding request may be received from the first node of the MaaS network 100. The circuitry 1002 may be configured to receive an onboarding request from a first node (for example, the second set of MaaS player nodes 106) of the MaaS network 100. In an example, the onboarding request may be received from the set of users 216 through the second set of MaaS player nodes 106.

At 1112, the DID of the first node may be verified based on the received onboarding request. The circuitry 1002 may be configured to verify a DID of the first node based on the received onboarding request. For example, by using DID and Self Sovereign Identity (SSI) of the first node, the electronic device 102 may verify the credentials of the first node. It may be appreciated that by verification of the credentials of the first node, an identity of a user or personnel associated with an organization associated with the first node may be authenticated. Further, based on verification of the first node, information associated with the user or the personnel associated with the organization may be stored at an identity provider (IDP). For example, based on verification of the first node, an access to the MaaS platform 108 may be granted to the user or the personnel associated with the organization. The verification of the credentials of the first node is described further, for example, in FIGS. 4A and 4B.

At 1114, the set of parameters and the service agreement associated with the first node may be transmitted to the first node based on the verified DID, transmitted set of onboarding agreements, and the set of service and agreement templates. The circuitry 1002 may be configured to transmit, to the first node, a set of parameters and a service agreement associated with the first node, based on the verified DID, transmitted set of onboarding agreements, and the set of service and agreement templates. For example, based on the granted access, the set of parameters, and the service agreement, the user or the personnel of the organization may generate a service agreement. The generation of the service agreement may be further based on the set of service and agreement templates generated by the MaaS community 302.

At 1116, the service agreement associated with the first node may be transmitted to the created MaaS node group. The circuitry 1002 may be configured to transmit the service agreement associated with the first node to the created MaaS node group (such as, the MaaS community 302).

At 1118, the API key of the data hub for the MaaS network 100 may be generated based on the transmitted service agreement, wherein the first node may be onboarded to the created MaaS node group of the MaaS network 100 based on the generated API key and the transmitted service agreement associated with the first node. The circuitry 1002 may be configured to generate an API key of a data hub for the MaaS network 100, based on the received service agreement. The first node may be onboarded to the created MaaS node group (such as, the MaaS community 302) of the MaaS network 100 based on the generated API key and the transmitted service agreement associated with the first node. For example, based on the transmission of the service agreements if data may be needed to be shared, then the API keys may be generated using the DID credential. Further, the API keys may be shared with the first node to enable the first node to communicate with other nodes of the MaaS network 100 and for data sharing. The secure onboarding of the first node to the MaaS network 100 is described further, for example, in FIG. 9. Control may pass to end.

Although the flowchart 1100 is illustrated as discrete operations, such as 1104, 1106, 1108, 1110, 1112, 1114, 1116 and 1118, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer-readable medium and/or storage medium having stored thereon, computer-executable instructions executable by a machine and/or a computer to operate an electronic device (for example, the electronic device 102). Such instructions may cause the electronic device 102 to perform operations that may include reception of the set of onboarding agreements from a set of nodes of a MaaS network (e.g., the MaaS network 100). The set of nodes may include at least one of a first set of mobility provider nodes (e.g., the first set of mobility provider nodes 104) and a second set of MaaS player nodes (e.g., the second set of MaaS player nodes 106). The operations may further include generation of a set of service and agreement templates based on the received set of onboarding agreements to create a MaaS node group (such as, the MaaS community 302) corresponding to the set of nodes. The operations may further include transmission of the received set of onboarding agreements and the generated set of service and agreement templates to the created MaaS node group (such as, the MaaS community 302). The operations may further include reception of an onboarding request from a first node of the MaaS network 100. The operations may further include verification of a decentralized identity (DID) of the first node based on the received onboarding request. The operations may further include transmission of the first node, a set of parameters and a service agreement associated with the first node, based on the verified DID, transmitted set of onboarding agreements, and the set of service and agreement templates. The operations may further include transmission of the service agreement associated with the first node to the created MaaS node group (such as, the MaaS community 302). The operations may further include generation of an API key of a data hub for the MaaS network 100, based on the received service agreement. The first node may be onboarded to the created MaaS node group (such as, the MaaS community 302) of the MaaS network 100 based on the generated API key and the transmitted service agreement associated with the first node.

Exemplary aspects of the disclosure may provide an electronic device (such as, an electronic device 102 of FIG. 1) that includes circuitry (such as, the circuitry 1002). The circuitry 1002 may be configured to receive the set of onboarding agreements from a set of nodes of a MaaS network (such as the MaaS network 100). The set of nodes may include at least one of a first set of mobility provider nodes (such as, the first set of MP nodes 104) and a second set of MaaS player nodes (such as, the second set of MaaS player nodes 106). The set of onboarding agreements may correspond to at least one of a master service agreement, a terms-of-service agreement, or a privacy policy agreement. In an example, the set of onboarding agreements may be received from the second set of MaaS player nodes 106. The MaaS network 100 may further include at least one of an issuer node (such as the issuer node 112) associated with the credential issuing authority, a set of holder nodes (such as the set of holder nodes 114) corresponding to the set of nodes, a verifier node (such as the verifier node 116) associated with a MaaS network (such as the MaaS network 100) owner, and a distributed ledger database (such as, the first distributed ledger database 118 and the second distributed ledger database 120).

Further, the circuitry 1002 may be configured to generate a set of service and agreement templates (such as the set of service and agreement templates) based on the received set of onboarding agreements to create a MaaS node group (such as, the MaaS community 302) corresponding to the set of nodes. Further, the circuitry 1002 may be configured to transmit the received set of onboarding agreements and the generated set of service and agreement templates to the created MaaS node group (such as, the MaaS community 302). In an embodiment, the MaaS community 302 may generate the MSA, the ToS, and the PP.

Further, the circuitry 1002 may be configured to receive an onboarding request from a first node (for example, the second set of MaaS player nodes 106) of the MaaS network 100. In an example, the onboarding request may be received from the set of users 216 through the second set of MaaS player nodes 106. The circuitry 1002 may further verify a decentralized identity (DID) of the first node based on the received onboarding request.

Further, the circuitry 1002 may be configured to transmit, to the first node, a set of parameters (such as the set of parameters) and a service agreement (such as the service agreement) associated with the first node, based on the verified DID, the transmitted set of onboarding agreements, and the set of service and agreement templates.

Further, the circuitry 1002 may be configured to transmit the service agreement associated with the first node to the created MaaS node group (such as, the MaaS community 302). The circuitry 1002 may be configured to generate an API key of a data hub for the MaaS network 100, based on the received service agreement. The first node may be onboarded to the created MaaS node group (such as, the MaaS community 302) of the MaaS network 100 based on the generated API key and the transmitted service agreement associated with the first node.

In an embodiment, each of the issuer node 112, the set of holder nodes 114, and the verifier node 116 may be associated with the second distributed ledger database 120 and may include a corresponding DID agent.

In an embodiment, the issuer node 112 may be configured to generate credentials associated with each holder node of the set of holder nodes 114.

In an embodiment, the generated credentials may correspond to a set of attributes including at least one of an organization name, an organization ID, a name and electronic-mail ID of an administrator user, a role of a user of a node, or a user privilege level associated with a user of a node.

In an embodiment, the verifier node may be configured to receive a credential verification request associated with the first node, based on the received onboarding request of the first node. The verifier node may further query a holder node of the set of holder nodes 114 for verified credentials of the first node, based on the received credential verification request. Thereafter, the verifier node 116 may be configured to receive, from the holder node, the verified credentials of the first node, based on the query. The DID of the first node may be verified based on the received verified credentials of the first node.

In an embodiment, the circuitry 1002 may be further configured to create a user profile and a role for the user profile, associated with the first node in the MaaS network 100. The creation of the user profile and the role may be based on the verified DID of the first node and a scheduler (e.g., the scheduler 416).

In an embodiment, the circuitry 1002 may further be configured to receive, from the first MaaS player node of the second set of MaaS player nodes 106, the first master service agreement (MSA) and counterparty details associated with the first MaaS player node. The counterparty details may correspond to the first mobility provider node of the first set of mobility provider nodes 104. The circuitry 1002 may be further configured to transmit, to the first mobility provider node, the first MSA, based on received the counterparty details. Thereafter, the circuitry 1002 may be configured to receive, from the first mobility provider node, an input indicative of an acceptance of the transmitted first MSA. The first MSA may be established between the first MaaS player node and the first mobility provider node, based on the received input indicative of the acceptance of the transmitted first MSA.

In an embodiment, the circuitry 1002 may further be configured to receive, from the first MaaS player node, the first service agreement associated with the first MaaS player node. The circuitry 1002 may further be configured to associate the received first service agreement with process service information and the first MSA, to determine an MSA bound service agreement. The circuitry 1002 may further be configured to transmit, to the first mobility provider node, the determined MSA-bound service agreement. The circuitry 1002 may further be configured to receive, from the first mobility provider node, an input indicative of an acceptance of the transmitted MSA-bound service agreement. The first service agreement may be established between the first MaaS player node and the first mobility provider node, based on the received input indicative of the acceptance of the transmitted MSA-bound service agreement.

In an embodiment, the circuitry 1002 may further be configured to receive, from the first MaaS player node, the first terms-of-service (ToS) associated with the first MaaS player node. Further, the circuitry 1002 may be configured to associate the received first ToS with the first service agreement to determine the service agreement bound-ToS. Further, the circuitry 1002 may be configured to transmit, to the first mobility provider node, the determined service agreement bound-ToS. Thereafter, the circuitry 1002 may be configured to receive, from the first mobility provider node, an input indicative of an acceptance of the transmitted service agreement bound-ToS. The first ToS may be established between the first MaaS player node and the first mobility provider node, based on the received input indicative of the acceptance of the transmitted service agreement bound-ToS.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. An electronic device, comprising:
   circuitry configured to:
   receive a set of onboarding agreements from a set of nodes of a mobility-as-a-service (MaaS) network, wherein
   the set of nodes includes at least one of a first set of mobility provider nodes and a second set of MaaS player nodes;
   generate a set of service and agreement templates based on the received set of onboarding agreements to create a MaaS node group corresponding to the set of nodes;
   transmit the received set of onboarding agreements and the generated set of service and agreement templates to the created MaaS node group;
   receive an onboarding request from a first node of the MaaS network;
   verify a decentralized identity (DID) of the first node based on the received onboarding request;
   transmit, to the first node, a set of parameters and a service agreement associated with the first node, based on the verified DID, transmitted set of onboarding agreements, and the set of service and agreement templates;
   transmit the service agreement associated with the first node to the created MaaS node group; and
   generate an Application Programming Interface (API) key of a data hub for the MaaS network, based on the DID of the first node and the transmitted service agreement, wherein
   the first node is onboarded to the created MaaS node group of the MaaS network based on the generated API key and the transmitted service agreement associated with the first node.

2. The electronic device according to claim 1, wherein the set of onboarding agreements corresponds to at least one of a master service agreement, a terms-of-service agreement, or a privacy policy agreement.

3. The electronic device according to claim 1, wherein the MaaS network includes at least one of:
   an issuer node associated with a credential issuing authority,
   a set of holder nodes corresponding to the set of nodes,
   a verifier node associated with a MaaS network owner, and
   a distributed ledger database.

4. The electronic device according to claim 3, wherein
   each of the issuer node, the set of holder nodes, and the verifier node, is associated with the distributed ledger database, and
   each of the issuer node, the set of holder nodes, and the verifier node includes a corresponding DID agent.

5. The electronic device according to claim 3, wherein the issuer node generates credentials associated with each holder node of the set of holder nodes.

6. The electronic device according to claim 5, wherein
   the generated credentials correspond to a set of attributes including at least one of an organization name, an organization ID, a name and electronic-mail ID of an administrator user, a role of a user of a node, or a user privilege level associated with the user of the node.

7. The electronic device according to claim 3, wherein the verifier node:
   receives a credential verification request associated with the first node, based on the received onboarding request of the first node;
   queries a holder node of the set of holder nodes for verified credentials of the first node, based on the received credential verification request; and
   receives, from the holder node, the verified credentials of the first node, based on the query, wherein
   the DID of the first node is verified based on the received verified credentials of the first node.

8. The electronic device according to claim 1, wherein
   the circuitry is further configured to create a user and a role for the user, associated with the first node in the MaaS network, and
   the creation of the user and the role is based on the verified DID of the first node and a scheduler.

9. The electronic device according to claim 1, wherein the circuitry is further configured to:
   receive, from a first MaaS player node of the second set of MaaS player nodes, a first master service agreement (MSA) and counterparty details associated with the first MaaS player node, wherein
   the counterparty details correspond to a first mobility provider node of the first set of mobility provider nodes;
   transmit, to the first mobility provider node, the first MSA, based on received the counterparty details; and
   receive, from the first mobility provider node, an input indicative of an acceptance of the transmitted first MSA, wherein
   the first MSA is established between the first MaaS player node and the first mobility provider node, based on the received input indicative of the acceptance of the transmitted first MSA.

10. The electronic device according to claim 9, wherein the circuitry is further configured to:
    receive, from the first MaaS player node, a first service agreement associated with the first MaaS player node;

associate the received first service agreement with process service information and the first MSA, to determine an MSA bound service agreement;

transmit, to the first mobility provider node, the determined MSA bound service agreement; and receive, from the first mobility provider node, an input indicative of an acceptance of the transmitted MSA bound service agreement, wherein the first service agreement is established between the first MaaS player node and the first mobility provider node, based on the received input indicative of the acceptance of the transmitted MSA bound service agreement.

11. The electronic device according to claim 10, wherein the circuitry is further configured to:

receive, from the first MaaS player node, a first terms-of-service (ToS) associated with the first MaaS player node;

associate the received first ToS with the first service agreement to determine a service agreement bound-ToS;

transmit, to the first mobility provider node, the determined service agreement bound-ToS; and receive, from the first mobility provider node, an input indicative of an acceptance of the transmitted service agreement bound-ToS, wherein the first ToS is established between the first MaaS player node and the first mobility provider node, based on the received input indicative of the acceptance of the transmitted service agreement bound-ToS.

12. The electronic device according to claim 11, wherein the circuitry is further configured to:

receive, from the first MaaS player node, a second ToS associated with the first MaaS player node, wherein the second ToS corresponds to a new version of the established first ToS;

transmit, to the first mobility provider node, the second ToS;

receive, from the first mobility provider node, an input indicative of an acceptance of the second ToS; and disable the first ToS established between the first MaaS player node and the first mobility provider node, based on the received input indicative of the acceptance of the second ToS, wherein the second ToS is established between the first MaaS player node and the first mobility provider node, based on the disablement of the first ToS.

13. A method, comprising:

in an electronic device:

receiving a set of onboarding agreements from a set of nodes of a mobility-as-a-service (MaaS) network, wherein the set of nodes includes at least one of a first set of mobility provider nodes and a second set of MaaS player nodes;

generating a set of service and agreement templates based on the received set of onboarding agreements to create a MaaS node group corresponding to the set of nodes;

transmitting the received set of onboarding agreements and the generated set of service and agreement templates to the created MaaS node group;

receiving an onboarding request from a first node of the MaaS network;

verifying a decentralized identity (DID) of the first node based on the received onboarding request;

transmitting, to the first node, a set of parameters and a service agreement associated with the first node, based on the verified DID, transmitted set of onboarding agreements, and the set of service and agreement templates;

transmitting the service agreement associated with the first node to the created MaaS node group; and generating an Application Programming Interface (API) key of a data hub for the MaaS network, based on the DID of the first node and the transmitted service agreement, wherein the first node is onboarded to the created MaaS node group of the MaaS network based on the generated API key and the transmitted service agreement associated with the first node.

14. The method according to claim 13, wherein the set of onboarding agreements corresponds to at least one of a master service agreement, a terms-of-service agreement, or a privacy policy agreement.

15. The method according to claim 13, wherein the MaaS network includes at least one of:

an issuer node associated with a credential issuing authority, a set of holder nodes corresponding to the set of nodes, a verifier node associated with a MaaS network owner, and a distributed ledger database.

16. The method according to claim 15, wherein each of the issuer node, the set of holder nodes, and the verifier node is associated with the distributed ledger database and each of the issuer node, the set of holder nodes, and the verifier node includes a corresponding DID agent.

17. The method according to claim 15, wherein the issuer node generates credentials associated with each holder node of the set of holder nodes, and the generated credentials correspond to a set of attributes including at least one of an organization name, an organization ID, a name and electronic-mail ID of an administrator user, a role of a user of a node, or a user privilege level associated with the user of the node.

18. The method according to claim 15, wherein the verifier node:

receives a credential verification request associated with the first node, based on the received onboarding request of the first node;

queries a holder node of the set of holder nodes for verified credentials of the first node, based on the received credential verification request; and receives, from the holder node, the verified credentials of the first node, based on the query, wherein the DID of the first node is verified based on the received verified credentials of the first node.

19. The method according to claim 13, further comprising creating a user and a role for the user, associated with the first node in the MaaS network, wherein the creation of the user and the role is based on the verified DID of the first node and a scheduler.

20. A non-transitory computer-readable medium having stored thereon, computer-executable instructions that when executed by an electronic device, causes the electronic device to execute operations, the operations comprising:

receiving a set of onboarding agreements from a set of nodes of a mobility-as-a-service (MaaS) network, wherein the set of nodes includes at least one of a first set of mobility provider nodes and a second set of MaaS player nodes;

generating a set of service and agreement templates based on the received set of onboarding agreements to create a MaaS node group corresponding to the set of nodes;

transmitting the received set of onboarding agreements and the generated set of service and agreement templates to the created MaaS node group;

receiving an onboarding request from a first node of the MaaS network;

verifying a decentralized identity (DID) of the first node based on the received onboarding request;

transmitting, to the first node, a set of parameters and a service agreement associated with the first node, based on the verified DID, transmitted set of onboarding agreements, and the set of service and agreement templates;

transmitting the service agreement associated with the first node to the created MaaS node group; and generating an Application Programming Interface (API) key of a data hub for the MaaS network, based on the DID of the first node and the transmitted service agreement, wherein the first node is onboarded to the created MaaS node group of the MaaS network based on the generated API key and the transmitted service agreement associated with the first node.

* * * * *